United States Patent
Ahmed et al.

(10) Patent No.: US 10,261,177 B2
(45) Date of Patent: Apr. 16, 2019

(54) SYSTEM AND A METHOD FOR THE EFFICIENT SCANNING OF OBJECTS

(71) Applicant: Rohde & Schwarz GmbH & Co. KG, Munich (DE)

(72) Inventors: Sherif Sayed Ahmed, Munich (DE); Olaf Ostwald, Munich (DE); Christian Evers, Kirchheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 431 days.

(21) Appl. No.: 14/917,973

(22) PCT Filed: Jan. 23, 2015

(86) PCT No.: PCT/EP2015/051321
§ 371 (c)(1),
(2) Date: Mar. 10, 2016

(87) PCT Pub. No.: WO2015/110564
PCT Pub. Date: Jul. 30, 2015

(65) Prior Publication Data
US 2016/0216371 A1    Jul. 28, 2016

(30) Foreign Application Priority Data

Jan. 23, 2014  (DE) .................. 10 2014 201 261
Mar. 3, 2014   (DE) .................. 10 2014 203 816
May 28, 2014   (DE) .................. 10 2014 210 227

(51) Int. Cl.
G01S 13/88    (2006.01)
G01V 8/00     (2006.01)
(Continued)

(52) U.S. Cl.
CPC .......... G01S 13/887 (2013.01); G01S 13/867 (2013.01); G01S 13/89 (2013.01); G01V 8/005 (2013.01)

(58) Field of Classification Search
CPC ...... G01S 13/887; G01S 13/867; G01S 13/89; G01V 8/005
(Continued)

(56) References Cited

U.S. PATENT DOCUMENTS 6,965,340 B1 * 11/2005 Baharav ............... G01S 13/89
                                              342/175
8,060,339 B2    11/2011 Ammar
(Continued)

FOREIGN PATENT DOCUMENTS

DE    102010051207 A1    5/2012
WO    2006131910 A2     12/2006
(Continued)

OTHER PUBLICATIONS

Notification of Transmittal of Translation of the International Preliminary Report on Patentability (Chapter I or Chapter II) for International Application No. PCT/EP2015/051321, dated Aug. 4, 2016, 10 Page.

*Primary Examiner* — Timothy X Pham
(74) *Attorney, Agent, or Firm* — Ditthavong & Steiner, P.C.

(57) ABSTRACT

The present disclosure relates to systems and methods for scanning objects and persons, for example, persons in security gates, by means of microwave radiation. Such a system includes an arrangement of several panels between which an angled walk-through passage is formed.

15 Claims, 14 Drawing Sheets

Figure 1A:
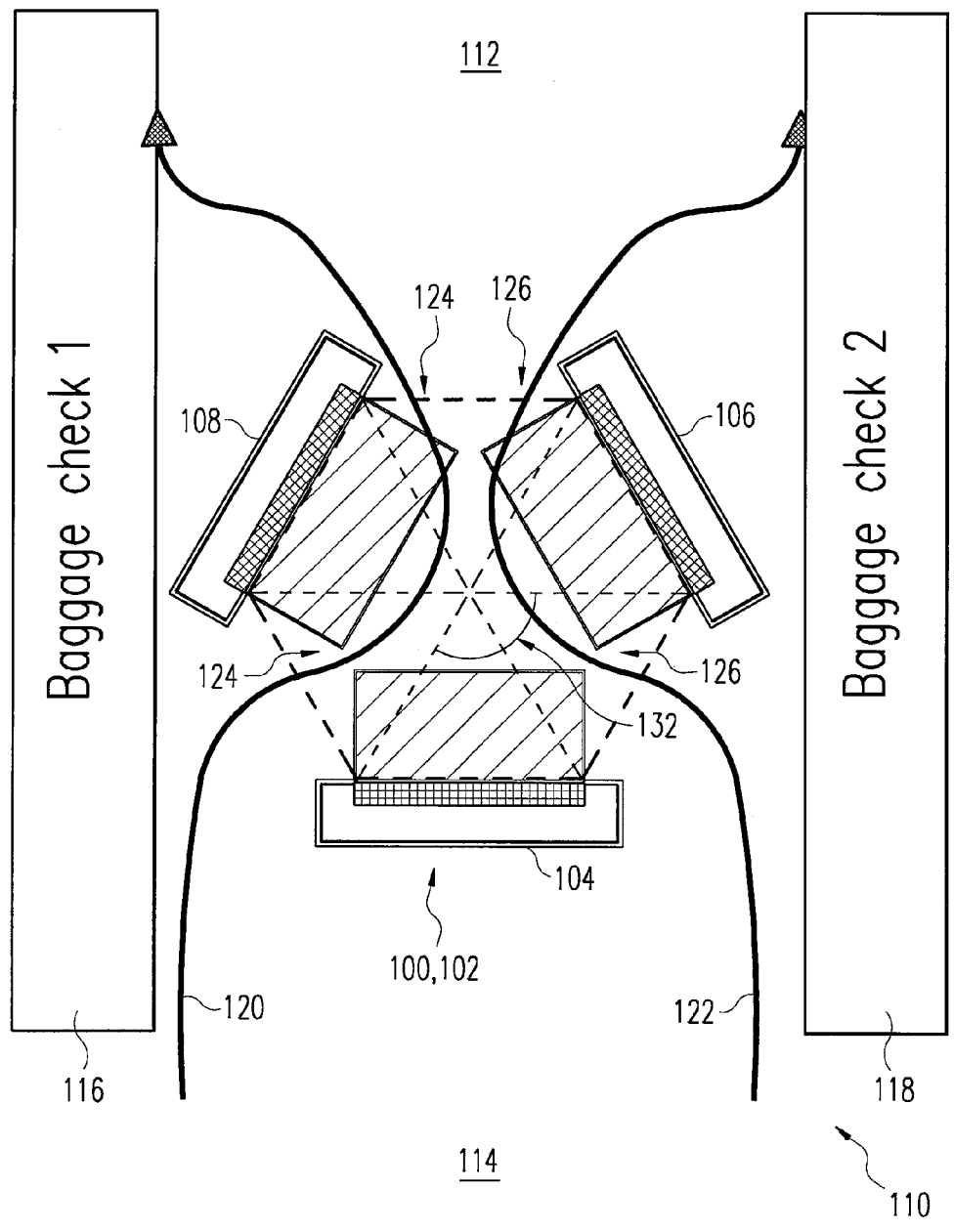

(51) Int. Cl.
*G01S 13/89* (2006.01)
*G01S 13/86* (2006.01)

(58) Field of Classification Search
USPC .......................................................... 342/22
See application file for complete search history.

(56) References Cited

U.S. PATENT DOCUMENTS

| | | | |
|---|---|---|---|
| 8,061,599 B2 | 11/2011 | Daly et al. | |
| 2006/0109160 A1* | 5/2006 | Baharav | G01S 13/89 342/22 |
| 2008/0303708 A1* | 12/2008 | Daly | B64F 1/368 342/22 |
| 2009/0284405 A1 | 11/2009 | Salmon et al. | |
| 2010/0034451 A1* | 2/2010 | Hughes | G01V 5/0025 382/132 |
| 2010/0072361 A1* | 3/2010 | Liu | G01V 8/005 250/286 |
| 2011/0163231 A1* | 7/2011 | Salmon | G01V 8/005 250/336.1 |
| 2015/0253422 A1* | 9/2015 | Morton | G01S 13/887 324/642 |

FOREIGN PATENT DOCUMENTS

| | | | |
|---|---|---|---|
| WO | 2012167847 A1 | 12/2012 | |
| WO | 2013037701 A1 | 3/2013 | |

\* cited by examiner

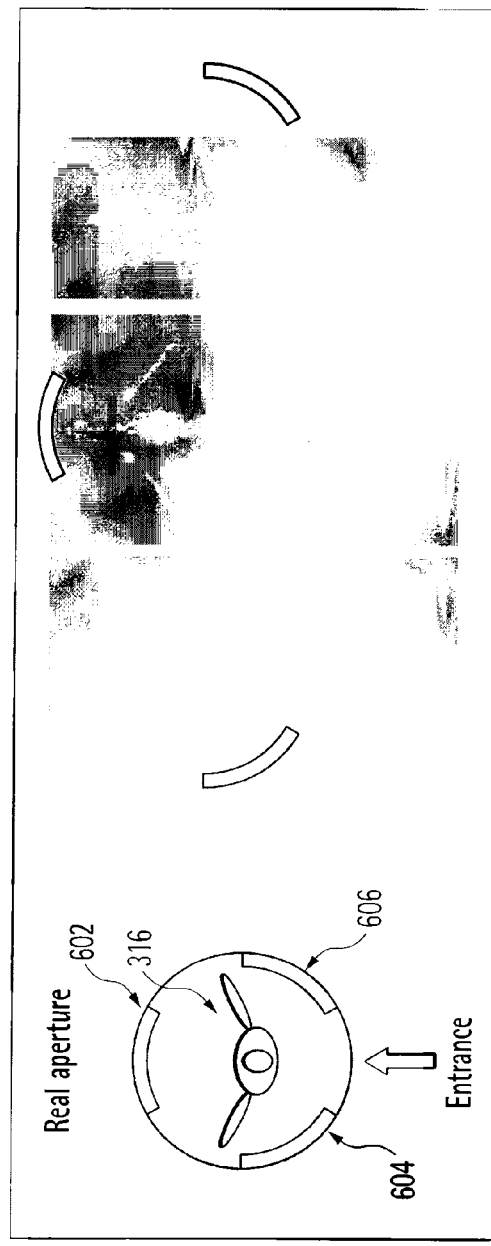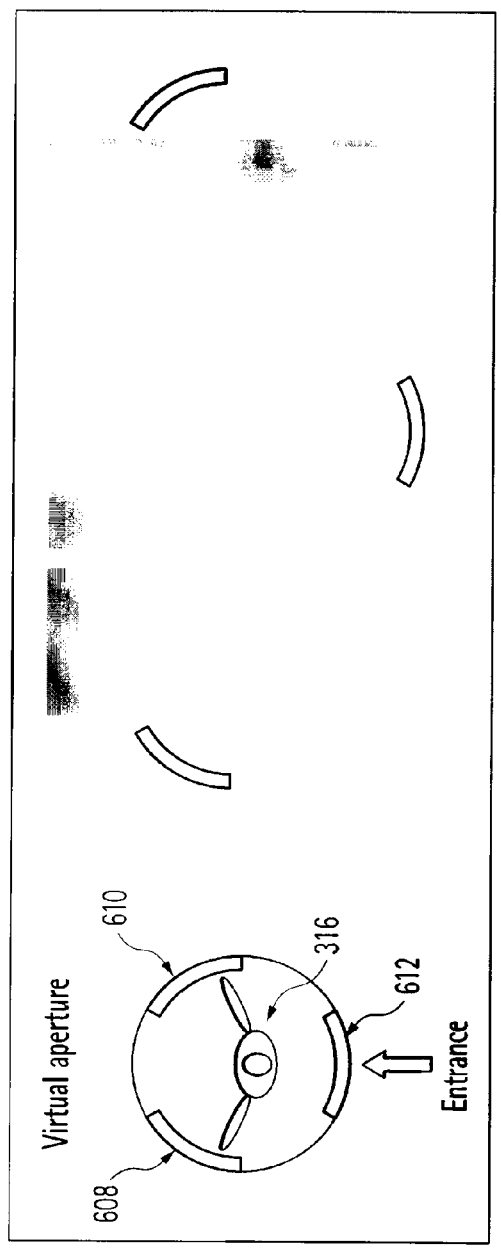

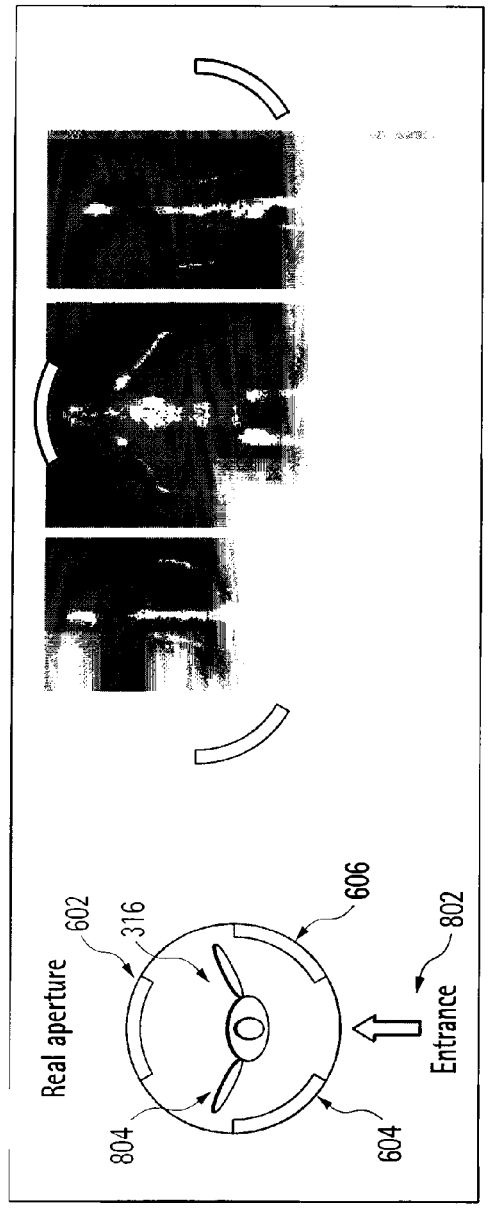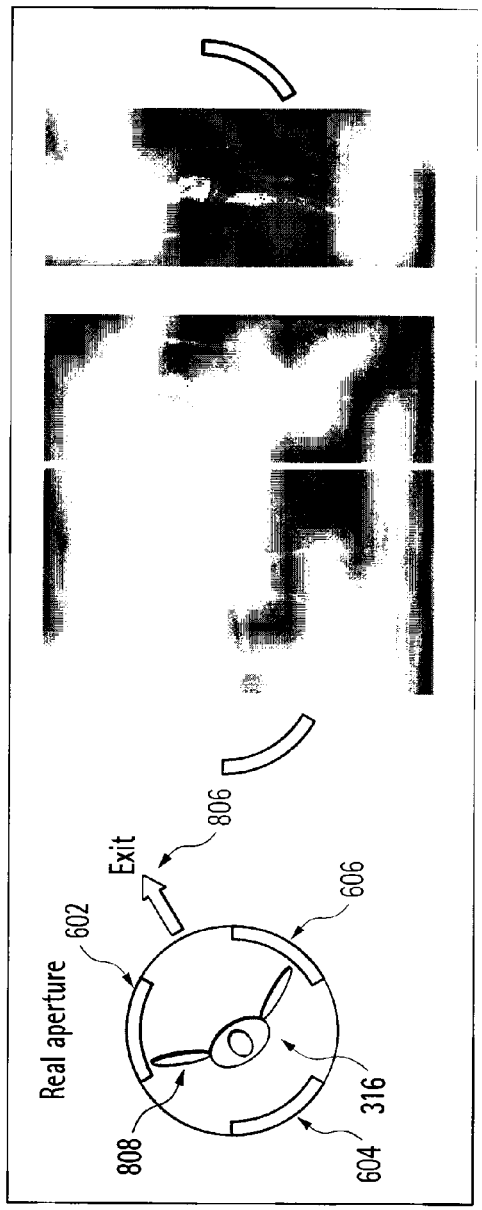

SYSTEM AND A METHOD FOR THE EFFICIENT SCANNING OF OBJECTS

CROSS-REFERENCE TO RELATED APPLICATIONS

The present application is a national phase application of PCT Application No. PCT/EP2015/0051321, filed Jan. 23, 2015, which claims priority to German Patent Application Nos. 10 2014 201 261.9, filed on Jan. 23, 2014, German Patent Application Nos. 10 2014 203 816.2, filed on Mar. 3, 2014, and German Patent Application Nos. 10 2014 210 227.8, filed on May 28, 2014, the entire contents of which are herein incorporated by reference.

TECHNICAL FIELD

The invention, according to the various embodiments described herein, relates to systems and methods for scanning objects and people, for example, people in security gates, by microwave radiation.

BACKGROUND

The use of radiation in the range from approximately 10 gigahertz (GHz) to approximately 100 GHz in non-destructive material testing and for full-body scanners is already known. The corresponding millimeter waves or respectively microwaves are suitable, for example, for the detection of metallic, but especially also non-metallic objects, for example, objects made from ceramic materials or certain synthetic materials. At the same time, air and materials such as those used, for example, for clothing, are transparent for such radiation. Accordingly, millimeter waves or microwaves are suitable, for example, for contactless detection of objects concealed beneath the clothing. Corresponding scanners can supplement or replace metal detectors, for example, in the field of security checks at airports or security-relevant public facilities.

During the operation of such a scanner, a microwave signal with a given bandwidth is generated and transmitted from at least one antenna in the direction towards a human body, optionally with objects concealed beneath the clothing. The microwave signals are reflected from the body and from the concealed objects. The reflections are received by at least one antenna. Separate transmitting and receiving antennas can be provided.

A scanner can also include a plurality of transmitting and/or receiving antennas. Such a scanner can be operated, for example, in a multi-static mode, in which a transmitting antenna transmits a signal, and reflections of this signal are received according to amplitude and phase position by several receiving antennas or by all receiving antennas, after which the next transmitting antenna transmits a signal etc.

Methods for aperture synthesis can also be used, for example, methods of digital beam forming ("Digital Beamforming", DBF), in which a focusing of the transmitted and/or received radiation can take place for the scanning of objects without mechanical movement of the antennas or electromagnetic bundling through lenses or similar. Instead, a focusing is implemented only through targeted control of the transmitting antennas and/or evaluation of the signals detected by the receiving antennas. In the latter case, a signal reflected from a given spatial point by a software-based algorithm in the direction towards several antennas and received there, is evaluated accordingly.

Even in the case of optimised hardware and with the use of highly developed signal processing, there is a continuing general requirement for an improvement in the detection capability of such scanners. It should be possible to obtain views or images of people and objects with sufficiently clear contours, so that an automatic detection, for example, of undesirable objects, is possible, and/or so that security personnel can be supported with the most reliable detection possible. In this context, the measurement times should be as short as possible, so that people can be scanned, for example, in an undisturbed movement flow.

Efforts have been directed primarily towards an improvement of illumination. For example, WO 2012/167847 A1 proposes the additional provision of at least one reflector element alongside an arrangement of transmitting/receiving antennas. As a result of the reflector element, a relatively larger proportion of the micrometer-wave signals can be used for the reconstruction.

U.S. Pat. No. 6,965,340 B1 describes a security gate with four panels arranged in an angled manner. A person walks in a straight line through the gate and is scanned in this context by means of microwave radiation.

SUMMARY

Accordingly, there is provided a system and method with an optimised detection capability with short measurement times, at minimal cost and with low complexity.

There is provided, inter alia, a system for scanning people and/or objects by means of microwaves or millimeter waves, wherein an arrangement of several panels is provided. Each panel includes transmitting units and/or receiving units. An angled walk-through passage is formed between the panels.

Each transmitting unit can include one or more transmitting antennas; each receiving unit can include one or more receiving antennas.

A panel can represent a construction unit which includes a plurality of transmitting and receiving antennas, for example, in the form of an array (antenna array). Panels which include only transmitting antennas or only receiving antennas are also conceivable. For example, an arrangement of panels could include at least one panel which has only transmitting antennas, and/or could include at least one panel which has only receiving antennas.

The antennas can have a common orientation such that, in a focus range or image-capture region disposed in front of the panel, a person and/or an object can be irradiated or respectively scanned, and a scan can be acquired from reflected radiation. The image-capture region should encompass a spatial volume which is at least substantially large enough to contain a person or substantial parts of the body, for example, one or more extremities, the torso etc. A projection of this volume onto a floor leads to an image-capture position which a person should occupy for an optimal illumination. In the following, the terms 'image-capture region' and 'image-capture position' are frequently used synonymously.

A panel can have a substantially flat, for example, rectangular shape. For an all-round illumination, a typical panel can be taller than human height and wider than an average person. A typical panel can have a height of approximately 2 meters (m) or more, preferably 2.50 m or more, and a width of, for example, of 1 m or more, preferably 1.50 m or more.

With different embodiments of the system according to the invention, two or more such panels are provided. Although embodiments with three panels are currently preferred, advantages of the invention can also be realised with only two panels, or with more than three panels, for example, four panels, five panels or even more panels. Several panels of identical construction can be used. In other embodiments, panels of different construction are used, which can differ, for example, in size of transmitting/receiving array, number of transmitting/receiving antennas, detection range, processing capacity etc.

The term 'walk-through passage' is intended to designate a route which a person takes when passing through the arrangement of panels, for example, because this is predetermined by the arrangement of panels, barriers, direction signs or respectively indications, such as arrows, notices and similar, construction measures etc. The term 'walk-through passage' implies that an arrangement of panels is designed so that a person can pass through this arrangement, that is, therefore, that, for example, a spacing distance between two panels is dimensioned such that a person can move between the two panels.

A given walk-through passage can include precisely one entrance and one exit. An arrangement of panels can allow or respectively provide one passage or several passages. Two or more walk-through passages can share entrance or exit. If they share entrance and exit, they are either identical or provide different routes within the arrangement.

An arrangement can include one or more entrances and one or more exits, that is, there can be several walk-through passages. With many embodiments, the entrance and exit of a walk-through passage can be identical, that is, a person enters the arrangement at the same position from which they leave it. With some embodiments, the entrance of a first walk-through passage can be identical to the exit of a second walk-through passage, and/or vice versa.

An entrance and/or exit can be formed between two panels, that is, the walk-through passage extends between the two panels into the arrangement or respectively out of the latter. For example, a walk-through passage can extend between a first and a second panel, which form an entrance into the arrangement, and can extend further between a third and a fourth panel, which form an exit from the arrangement. Not all of the first to the fourth panels need necessarily be different, that is, a walk-through passage can lead into the arrangement and also out again at one and the same panel.

According to the certain embodiments, a walk-through passage can extend in an angled manner within the arrangement. This should be understood to mean that the walk-through passage describes an angle, a bend, a curve or another turn between the entrance and the exit. With many embodiments, this means that a passage direction of a walk-through passage at the entrance and a corresponding passage direction at the exit enclose an angle different from 0°. The angle can be, for example, 180°, if the entrance and the exit coincide. However, with many embodiments, this angle can also be 0°, for example, if the walk-through passage describes a full circle within the interior of the arrangement.

The angled walk-through passage means that a person or another object under investigation which moves along the walk-through passage through the arrangement performs at least one change of direction in this context. A change of direction should be understood to mean a change in the movement route of at least 10°, or at least 20°, or at least 30°.

An angled walk-through passage can mean, for example, that a person entering the system, the facility or respectively the arrangement of panels through an entrance must turn through an angle different from 0° (10°, 20°, 30°) in order to leave the arrangement again through an exit. As explained, the angle of turning can be, for example, 180°: this can mean, for example, that the person enters the arrangement, turns around and leaves the arrangement on the same route by which s/he entered it.

At least two of the panels can be arranged at an angle relative to one another. A corresponding angle can be measured, for example, between the normal of a surface of the respective panel in the direction towards an image-capture region. An angular offset can be understood to mean, especially, an angle different from zero degrees (°). For example, at least two panels can be disposed side-by-side not having the same orientation, but being orientated towards a common, overlapping image-capture region, for example, in that both are arranged on an imaginary circular line, but are displaced relative to one another in such a manner that a desired angle is obtained between the normals.

An angle between two panels can also be 180°. However, in many embodiments of the present disclosure, at least one pair of panels is provided with an angular offset different from 0° and also different from 180°.

A specified angular offset between a pair of panels can be between 100° and 140°, preferably between 110° and 130°, and by particular preference approximately 120°. Another preferred angular range is disposed, for example, in the range from 72°. In general, a preferred angular range can be disposed within the range from 360°/n, wherein n indicates the number of panels of the arrangement.

In the case of a plurality of panels, pairs of panels arranged side-by-side can each have the same angular offset. Accordingly, in the case of three panels, for example, every two panels can be arranged with an angle of 120° relative to one another, and, in the case of five panels, with pairs of adjacent panels, these can be arranged with an angle of 72° relative to one another. With other embodiments, however, angles between different pairs of adjacent panels can be different, accordingly. In the case of a system with three panels, for example, the angle between one pair of panels can be 90°, and the angle between the other two pairs of adjacent panels can be 135° respectively.

While panels with a flat construction are conventional, it is, in principle, also possible to realise the angular offset under discussion here with an angled construction of the panel. Yet further panels can be curved and can have, for example, a concave or convex construction. The normal introduced above for the specification of the angular offset between panels would then preferably be understood as a normal which stands at the position of an axis of symmetry or a point of symmetry or another central point perpendicular to an active surface of the panel.

Embodiments of the present disclosure can, in general, include pairs of panels arranged or standing directly adjacent to one another, and also pairs of panels which are erected at a distance from one another.

With given embodiments of the present disclosure, all of the panels or some of the panels are orientated towards a common, that is, at least overlapping, image-capture region. In the case of panels of identical construction, which, in particular, provide the same spacing distance relative to the respective image-capture region, several panels or all panels of the system can be arranged on an imaginary circular line.

In this context, two panels can stand directly side-by-side at an angle, or a spacing distance can be left between these panels. With given embodiments, a spacing distance is provided between two panels in such a manner that a walk-through passage extends between the panels.

When reference is made to a person entering or walking through a unit or system, other types of movement can also be included in this, for example, movement by means of a wheelchair, crutches etc.

With some embodiments, the walk-through passage extends in such a manner through the arrangement of panels or respectively leads past the panels in such a manner that the person leaves the arrangement at a different side from that by which they entered, that is, entrance and exit are different.

Especially for an angled walk-through passage, an odd number of panels can be advantageous; for example, three or five panels can be used in this case; accordingly, an angled walk-through passage can be realised in a particularly simple manner. With three panels, for example, arrangements with one entrance and two exits or two entrances and one exit can be realised in a simple manner.

With many embodiments, the arrangement is formed with one entrance which is disposed frontally opposite to one of the panels. In this case, the walk-through passage must necessarily turn in front of this panel, that is, the walk-through passage or respectively route can be limited or respectively determined in a simple manner through the inclusion of the panel. The passage or respectively route can turn, for example, through 60°, for example, in the case of an arrangement with three panels, or, for example, in the case of an arrangement with five panels, it can turn through 40°. The passage can also turn through 180° and, for example, lead outwards again from the arrangement at the position of the entrance.

Several panels can be arranged in a "staggered" manner, that is, a gap can be present between two adjacent panels, in which a further panel has, in a sense, been omitted. The resulting gap can allow a walk-through passage. However, a corresponding spacing distance between two panels need not generally or necessarily correspond to the construction width of one panel. On the contrary, in the case of the presently preferred embodiment, a spacing distance between two adjacent panels corresponds to the length of a baseline of a transmitting and/or receiving array of a panel. This spacing distance is preferably not measured between two adjacent corner points of the frame or other mechanical elements of the panels, but between two adjacent corner points of the transmitting and/or receiving array of the two panels. Such a spacing distance allows a particularly advantageous implementation of methods for inter-panel imaging or respectively virtual aperture.

In addition to the micrometer-wave or millimeter-wave transmitting/receiving units, other sensor devices can be provided, which can be structurally associated with the panels or provided separately. For example, a sensor unit for registering a body position or orientation or respectively a body posture of a person can be provided. A simple example of such a sensor can be, for example, a movement sensor. With such a sensor device, it is possible to determine, for example, whether a person is disposed in the system, within an image-capture region etc., so that a scanning process can be triggered. More effort-intensive sensors can be used, for example, in order to establish an orientation of the body, and to trigger one or more scanning processes when a momentary orientation is optimal.

If further details, such as a momentary position of body parts, such as, for example, extremities (an arm, a leg etc.) are registered, a preferred time for the triggering can be determined, at which, for example, an irradiated region of the body is momentarily disposed at rest.

The illumination of the panel arrangement can be further improved, for example, by a reflector or several reflectors, which can be provided, for example, on the floor or in a ceiling of the arrangement.

The system can be combined with another millimeter-wave irradiation unit which is realised, for example, in the form of a gate or tunnel with panels arranged opposite to one another. Additional or different sensors can include, for example, a shoe scanner, one or more optical sensors, such as cameras etc.

Furthermore, a method for scanning a person and/or an object is proposed which can be implemented by means of a system as outlined above or described elsewhere in this specification. Accordingly, each panel of the system can receive at least transmitted signals from its own transmitting units or respectively transmitting antennas, and these can be evaluated, for example, in an evaluation unit associated with the panel and/or an evaluation unit associated with several panels, for example, a central evaluation unit of the system.

Signals which are transmitted from a panel and received again by the latter (for example, after reflection from the object under investigation), are designated as 'intra-panel' scans. With given embodiments, 'inter-panel' scans are produced, in which one panel receives signals from transmitting antennas of at least one of the other panels of the system, and these signals can be evaluated in an evaluation unit. The optionally reflected transmitted signals from different panels can be distinguished in this context, for example, in that the transmitting frequencies are displaced relative to one another and/or in that the panels transmit at different times. In order to obtain inter-panel scans, transmitting and receiving times between the panels must be synchronised in an appropriate manner.

An allocation of transmitting and receiving panels can be continued cyclically along the arrangement of panels in such a manner that every panel receives the transmitted signals of precisely one other panel, for example, in the case of an arrangement of the panels side-by-side, of the adjacent panel on its left or right. As a result, it is possible to obtain several inter-panel scans, and, in fact, from different observation angles, for example, virtual apertures.

The term 'scan' is intended merely to designate any representation of received signals, that is, an intra-panel or inter-panel scan merely designates any dataset, for example, a raw dataset, which is obtained from the transmission and reception of radiation. By contrast, the terms 'view' and 'image' preferably relate to a conventionally two-dimensional output, for example, on a display which is based upon a scan dataset. However, for reasons of concision, the different terms are occasionally used synonymously. The terms 'real aperture' and 'virtual aperture' relate primarily to images, since, in principle, different images, that is, images from different observation directions, can be constructed from scan datasets.

The acquisition of inter-panel scans necessarily presupposes the presence of at least two panels. If one pair of panels is arranged at an angle relative to one another, the angular offset and/or mutual spacing distance can be selected in such a manner that an acquisition of expedient inter-panel scans is optimised.

With given embodiments, two inter-panel scans are combined for the acquisition of a common image. This may relate to the mutual inter-panel scans of one panel pair. A view of a person and/or of an object can also be constructed (reconstructed) in this context as if it takes place through a virtual aperture, which can expediently be disposed, for example, between the two panels of the panel pair, in order to bridge a gap disposed here within the arrangement.

In order to acquire views through a virtual aperture, a single image-capture time or respectively a single scan or respectively scan-data acquisition phase may generally be sufficient, for example, at the time when a person is disposed in a common image-capture region of the panels. A single acquisition phase does not exclude the possibility that the transmission times of the panels for the acquisition of the data are displaced relative to one another.

Several acquisition phases can also be provided in each case for the acquisition of at least one scan or image. For example, in the presence of an angled walk-through passage which compels a person walking through to change direction, two or more acquisition phases can be provided. One or more scans can be acquired before the change of direction and one or more scans can be acquired after the change of direction. Accordingly, one and the same panel or respectively panel pair can acquire views in which the person is orientated differently relative to a real or virtual aperture.

With given embodiments, a first acquisition is implemented at the time of entry into an angled walk-through passage, in order to acquire intra-panel scans. A second acquisition can be triggered after a change in the direction of movement at the time of leaving the walk-through passage, in order to acquire further intra-panel scans. In the case of at least one of these acquisitions, inter-panel scans can be obtained additionally or alternatively.

With many embodiments, a standard set of scans or respectively images, which includes, for example, only real apertures, only virtual apertures or both, can be prepared in an acquisition phase. With different embodiments, for example, inter-panel scans and/or images from virtual apertures can be acquired and/or provided only as an option, for example, only if the operating personnel request this. For example, inter-panel scan (datasets) could, in fact, be acquired, but images could be reconstructed, for example, from the perspective of a virtual aperture, only when this is requested.

With given embodiments of methods according to the present disclosure, a data fusion is implemented. For example, information obtained from a plurality of different scans and/or through the use of further sensors, is combined in a common dataset, fused and/or represented. A combination of data from different sensors can take place in order to minimise the probability of false alarms, to increase a quality of display etc.

A dataset can be projected, for example, onto a three-dimensional avatar, which can be displayed on a screen, or respectively projections of which can be displayed on a screen. Given features automatically detected in a scan or an image can be marked in the dataset or on the images.

Embodiments of the method can include the acquisition of biometric data and/or the implementation of a comparison with pre-defined biometric data. In this manner, for example, it is possible to search for a given person whose body features are known.

Previous approaches for improving detection capability have concentrated on optimising the illumination for individual images, for example, a frontal view. By contrast, with different embodiments of the present disclosure, the emphasis is not only on the optimisation of individual images, but instead, a plurality of images should be prepared, wherein the images are complementary to one another, for example, because they are prepared from several mutually supporting observation angles, that is, for example, from different real and/or virtual apertures.

For example, the images can be not only a frontal view, rear view or lateral view, but complementary images in which the observation angles/apertures are displaced through angles, which can differ from 0°, 180°, or 90°, can also preferably be provided. Accordingly, for example, a frontal view or rear view can be combined with a lateral view rotated through 60°, or with two such views.

In this manner, a detection capability can be optimised, because structures, such as an object possibly concealed beneath the clothing can be analysed or respectively recognised (detected) considerably more easily, in an automated manner and/or by operating personnel, from different angles of observation. With known approaches for improving an illumination, for example, by means of reflectors, complementary images are not provided; for example, no further real or virtual apertures are added.

On the basis of a plurality of appropriate, preferably mutually complementary images or respectively images selected as required, a full illumination can accordingly be achieved, that is, an object under investigation such as a person and/or an object can therefore be displayed in a gap-free manner at least in portions, so that any structures present which are capable of being scanned by the radiation used, above a minimum size, for example, of 10 cm, or 5 cm, or 2 cm, or 1 cm, are visible on at least one of the images. In this context, a full illumination can be understood to mean that the plurality of views create the impression that a plurality of panels have been set up, at least in portions, in a gap-free manner around the object under investigation, that one panel has been rotated about the object at least in portions, and/or the object under investigation has at least partially turned, standing in front of a panel, in order to allow a full illumination.

The term 'full illumination' is intended to include not only a gap-free, 360° view of an object under investigation, but should also include a representation of the object under investigation obtained from a plurality of views, in which, for example, only one 270°, or only one 180° view of the object could be provided. Additionally or alternatively, a 'full illumination' should also be present if gaps remain between complementary views which are, however, so small that the risk of not detecting structures or respectively objects is minimised in a desired manner.

A full illumination can be represented, for example, by a series of six images of the object under investigation, which have each been obtained, for example, from observation angles displaced by 60° relative to one another, regardless of whether real or virtual apertures and/or a turning of the object relative to the panels in the walk-through passage are involved. The six images can include, for example, views from the front, from the rear, lateral views from the front left and right and lateral views from the rear left and right. However, this example does not exclude the possibility that a full illumination can be achieved with less than 6 views, for example, with only 5 or 4 images, or even fewer images. For example, 4 images can include two lateral views from the rear and two lateral views from the front.

The number of panels required according to certain embodiments for a full illumination can be less than the number of views from which a 360° impression of the person or respectively of the object under investigation can be obtained in the user's brain and/or through a system processing. Accordingly, for example, only five panels can be used for six views, or only four panels or only three panels. For a full illumination based on 4 views, only three panels or only two panels may be sufficient. Examples of such arrangements will be described in greater detail below.

One complexity of a system can be reduced in this manner by comparison with conventional systems, which can lead to correspondingly reduced costs for manufacture, servicing and operation.

In fact, systems with several panels are more effort-intensive as a whole than systems with only one panel. However, effort and cost are more than compensated by the gain in detection capability through the possibility of achieving complementary images. At the same time, techniques according to the present disclosures allow a minimisation of the number of panels. Accordingly, gap-free 360° representations of objects under investigation can be obtained by means of only three panels or even only two panels instead of on the basis of four panels.

During the passage through an arrangement according to the present disclosure, an object under investigation passes through an angled (turning, curved) route. The loss of convenience, for example, for people when passing through a security gate can be kept to a minimum in this context, for example, if only a single turning or rotation, for example, through 60° is required. At the same time, an angled walk-through passage with a minimum of panels allows a maximum of options for achieving a full illumination, for example, in that a person turns inside the arrangement, and/or through the acquisition of inter-panel views with relatively fewer panels than in the case of a conventional arrangement. Gap-free views of objects under investigation can be obtained in a simple manner on the basis of panel arrangements in which gaps remain between the panels.

Accordingly, a full illumination with relatively few panels can be provided, for example, in that at least one panel of the arrangement acquires at least two scans. In an operating mode with two separate acquisition phases, a panel can illuminate or respectively scan an object under investigation, for example, once before and once after a turn (intra-panel scans), that is, one and the same panel illuminates the object, while the latter is disposed in different positions, for example, at the time of entering and respectively leaving the arrangement. In an additional or alternative operating mode, one and the same panel can be used for an intra-panel image and an inter-panel image, for example, while the object is disposed in one and the same position; here also, views of the object can be acquired from different directions, and accordingly, a desired, for example, gap-free illumination can be achieved.

Reference is also made here to the fact that, in the presence of only one panel with an additional reflector, an illumination is, in fact, improved; however, the long beam pathways with reflections and corresponding attenuation is also associated with a reduction of luminous intensity. By contrast, with some embodiments of the present disclosure, several panels are provided which allow the acquisition of inter-panel scans or respectively views. In this context, the light pathways are shorter by comparison with a reflector, and fewer reflections and reduced attenuation therefore occur.

Inter-panel scans according to certain embodiments allow the provision of views from the observation angles of virtual apertures which are particularly suitable for the provision of complementary views, wherein the actual site of the panels (real apertures) can be a different one. Accordingly, the arrangement of panels can be optimised according to different perspectives, for example, in order to design an expedient walk-through passage. If the panels are set up in such a manner that a spacing distance between two adjacent panels corresponds to the length of a base line of the transmitting and/or receiving array of the panels, a virtual aperture can be disposed between the real apertures of the two panels, which, in a particularly advantageous manner, allows a gap-free representation of the object under investigation.

In the case of currently preferred embodiments, images from the perspective of at least one real aperture and from the perspective of at least one virtual aperture are supplemented in that, as a result, a complete or respectively gap-free all-round view is obtained, that is, a 360° view of the object under investigation, and, accordingly, a full illumination in the sense defined above. A virtual aperture can therefore be used in order to close a gap between two real apertures. Vice versa, the implementation of a virtual aperture means that a gap can be left in the panel arrangement at the corresponding position. This gap can be used to form an entrance and/or an exit for a walk-through passage or for several walk-through passages at this position, and for the first time, this allows the use of panel arrangements in which the panels are arranged on a circular line.

In order to acquire a plurality of scans or respectively views, an exaggeratedly increased computational performance or respectively evaluative performance or processor performance is not necessary. Dependent upon the embodiment, each panel can implement at least one preliminary evaluation of the signals acquired. Inter-panel scans can be realised at least partially on the basis of existing procedures. Furthermore, the acquisition and (pre-)evaluation of signals received can be implemented at times, in which the panel is not performing its own transmitting/receiving activities. By exploiting already available hardware and software equipment, inter-panel views therefore provide a particularly efficient possibility for providing additional views from different observation angles.

In order to obtain a plurality of complementary views which optimise a detection capability, angles between adjacent panels, which are noticeably smaller than 180°, but noticeably larger than 0° are optimal. Even with three panels, a large number of possibilities for complementary scans is obtained, as will be explained with reference to the examples below. Furthermore, with an odd number of panels, walk-through passages can be realised in a simple and efficient manner, which improve the possibility for acquiring complementary views even further. For example, an angled walk-through passage requires a change of direction of a person when walking through, so that one and the same panel can be used for the acquisition of different views, for example, frontal, rear and/or lateral views. With inter-panel views, the number of possible complementary views is further multiplied.

Which of a plurality of possible views should be realised in the case of a given panel arrangement or respectively unit, can be established, for example, in the case of the concrete configuration of a unit or respectively of a system, for example, if the number of panels to be used, number and orientation of the entrances and exits of the unit etc. are specified. Additionally or alternatively, configuration options can be presented to the operating personnel; for example, inter-panel views/virtual apertures can be provided by optional addition.

A downstream processing for the provision of a plurality of different views from different observation angles can include, for example, a parallel display of different views on an operating terminal, so that a combination of the information which can be obtained from the complementary views takes place. Additionally or alternatively, such an analysis can be further supported or respectively implemented by a central evaluation unit. Accordingly, superimposed views and/or fused views can be prepared, a 3-D model can be prepared, either on the basis of the registered data itself, or, by means of projection onto an avatar, the 3-D model can be displayed in virtually rotatable manner on a screen etc.

Figure 1B:
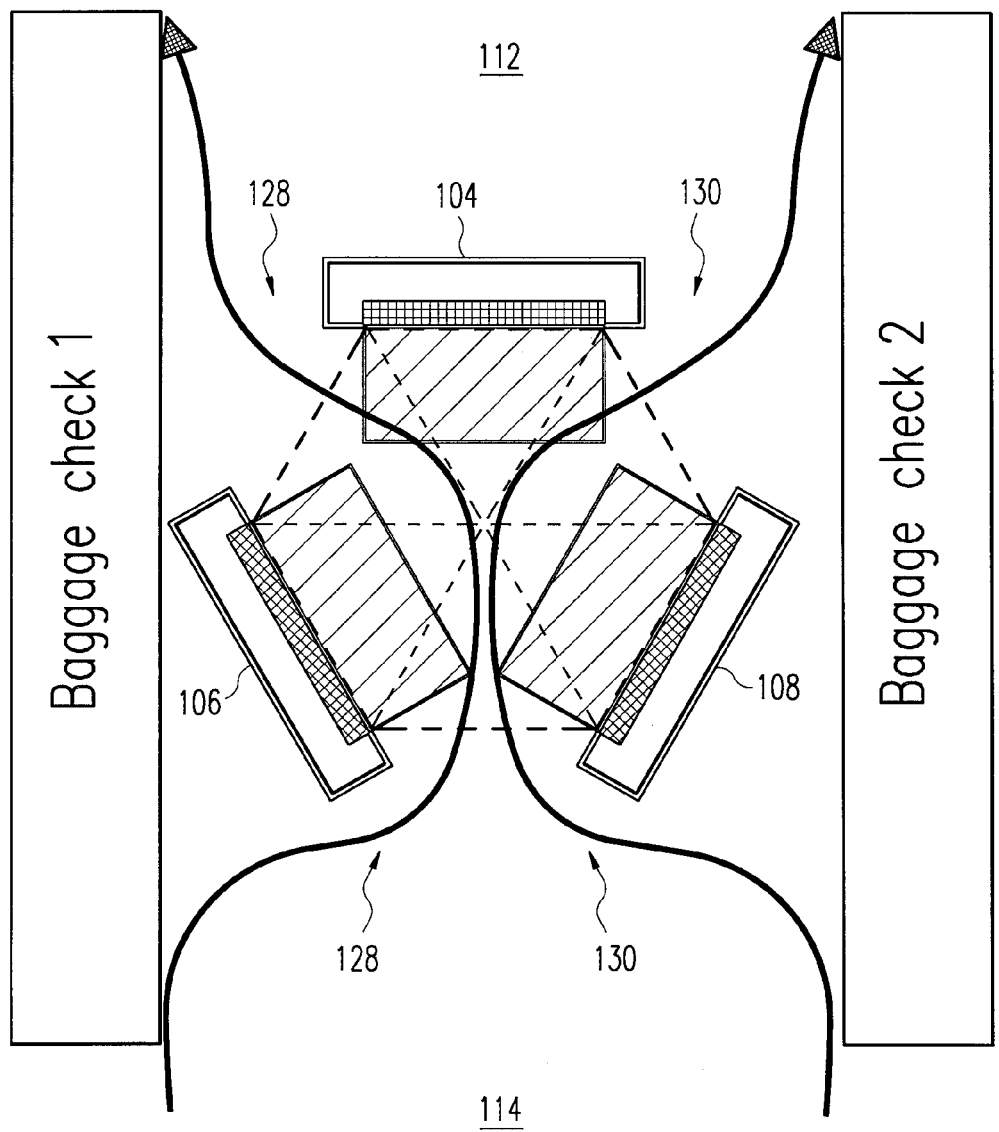
Figure 2:
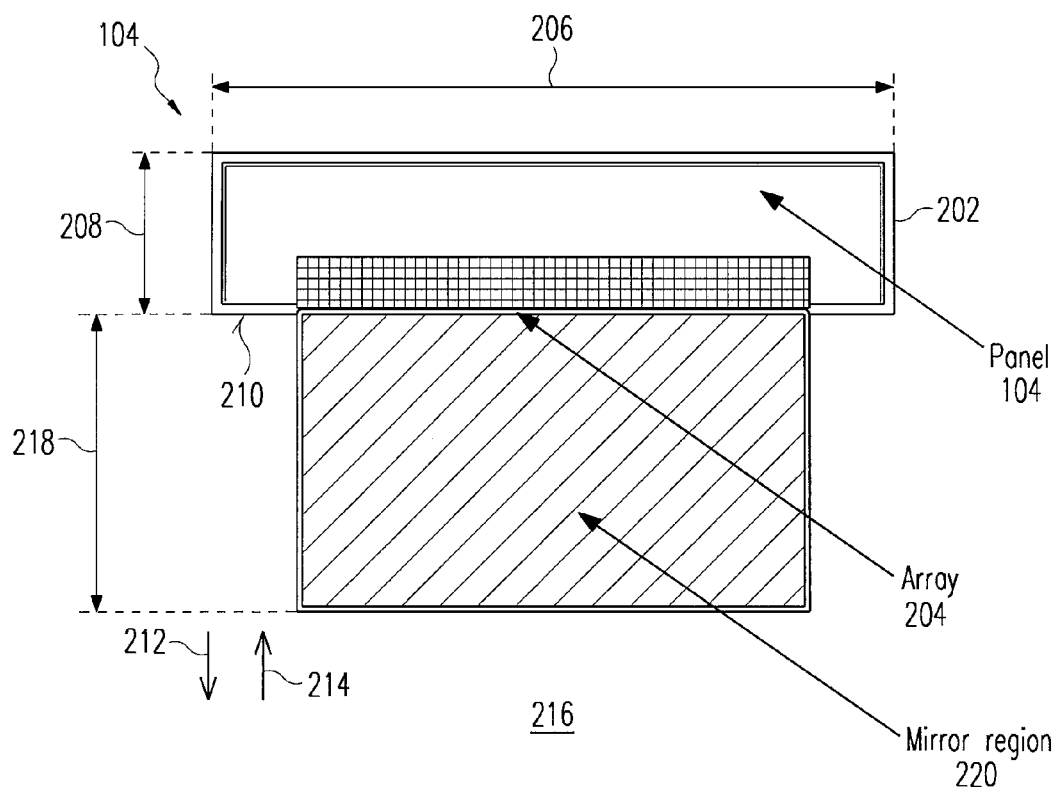
Figure 3:
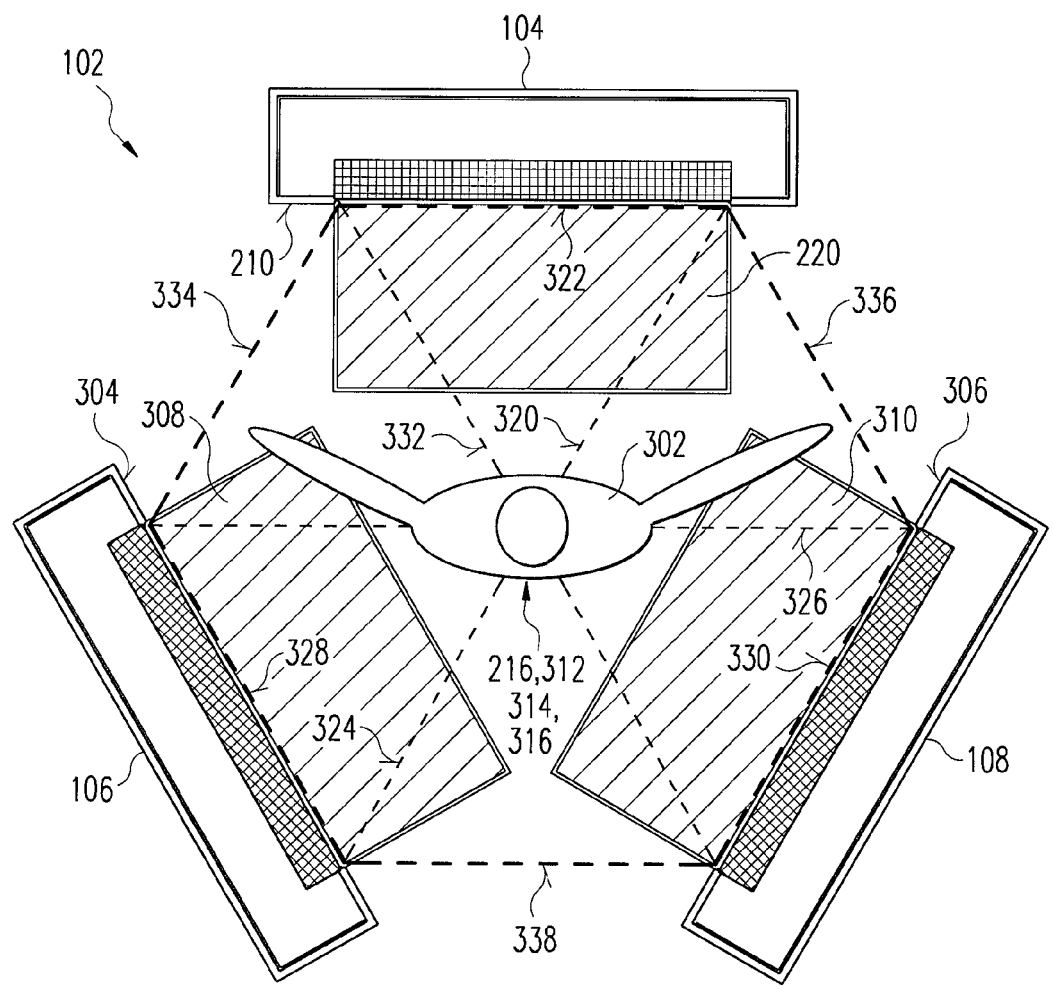
Figure 4:
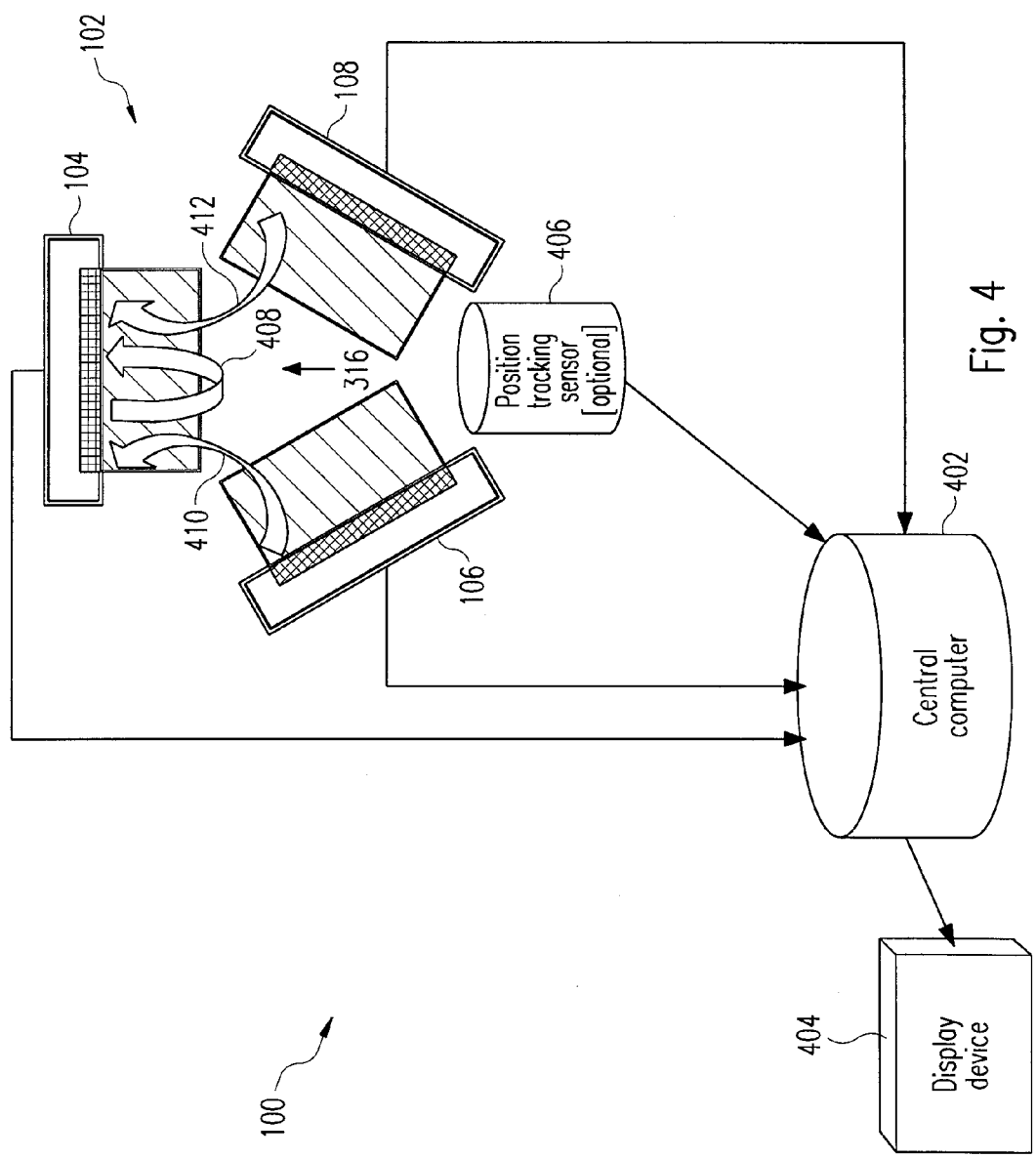
Figure 5:
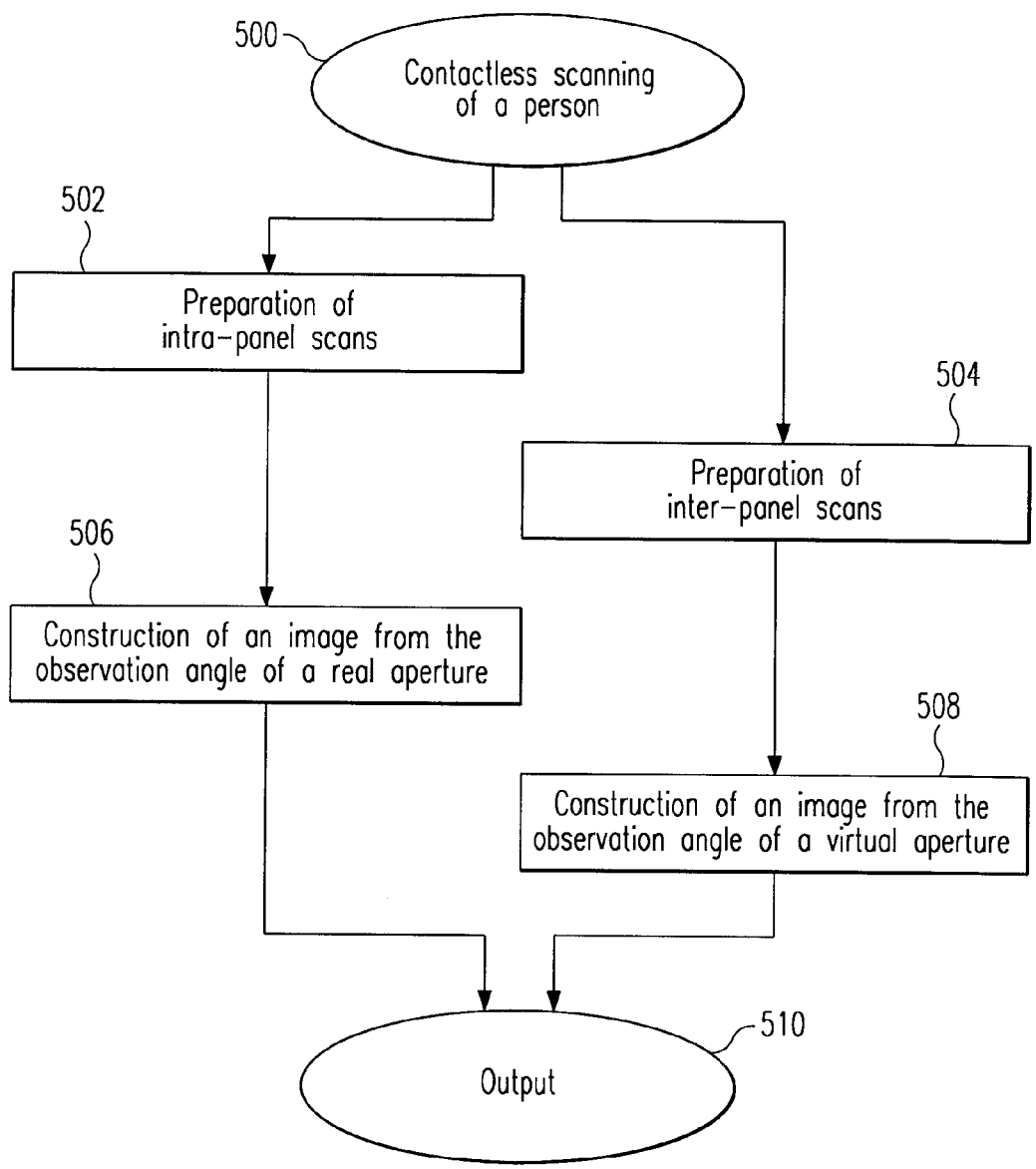
Figure 6:
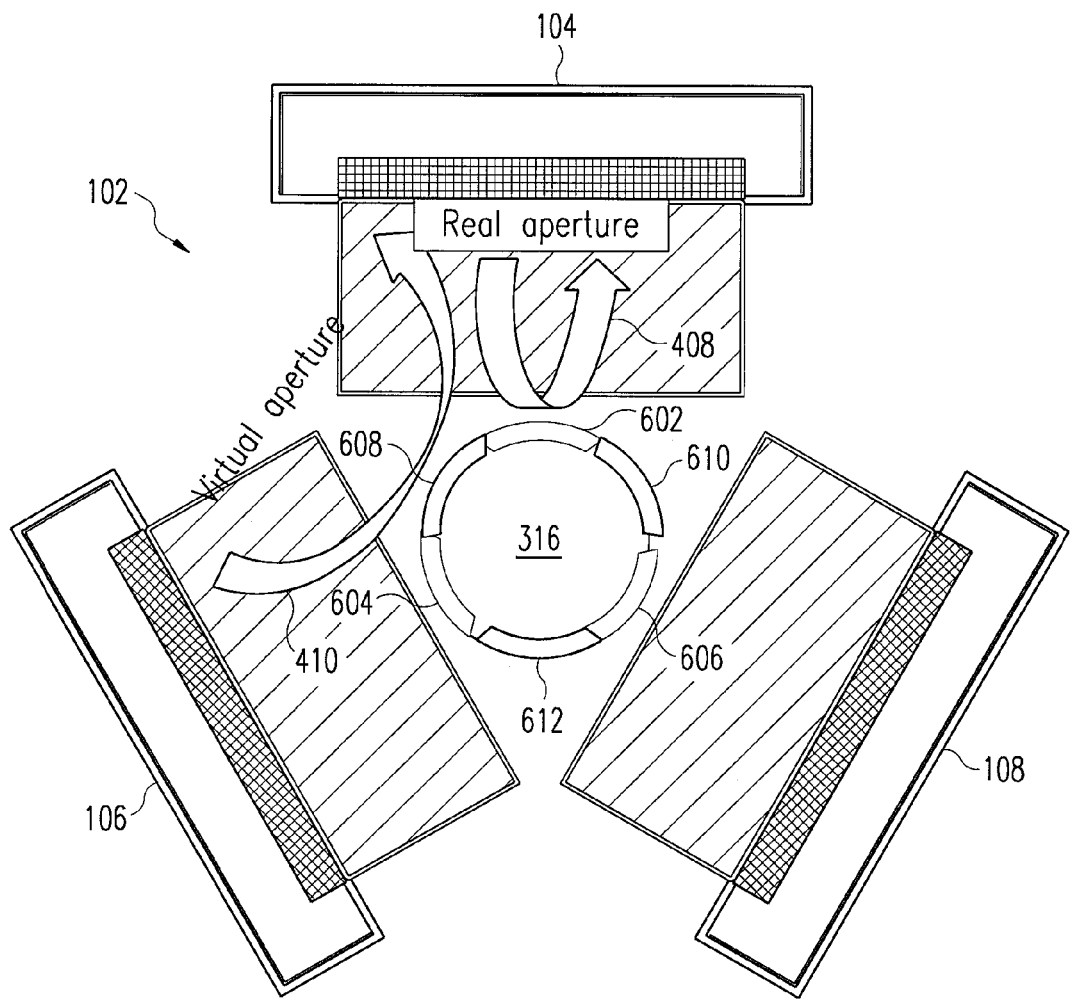
Figure 8:
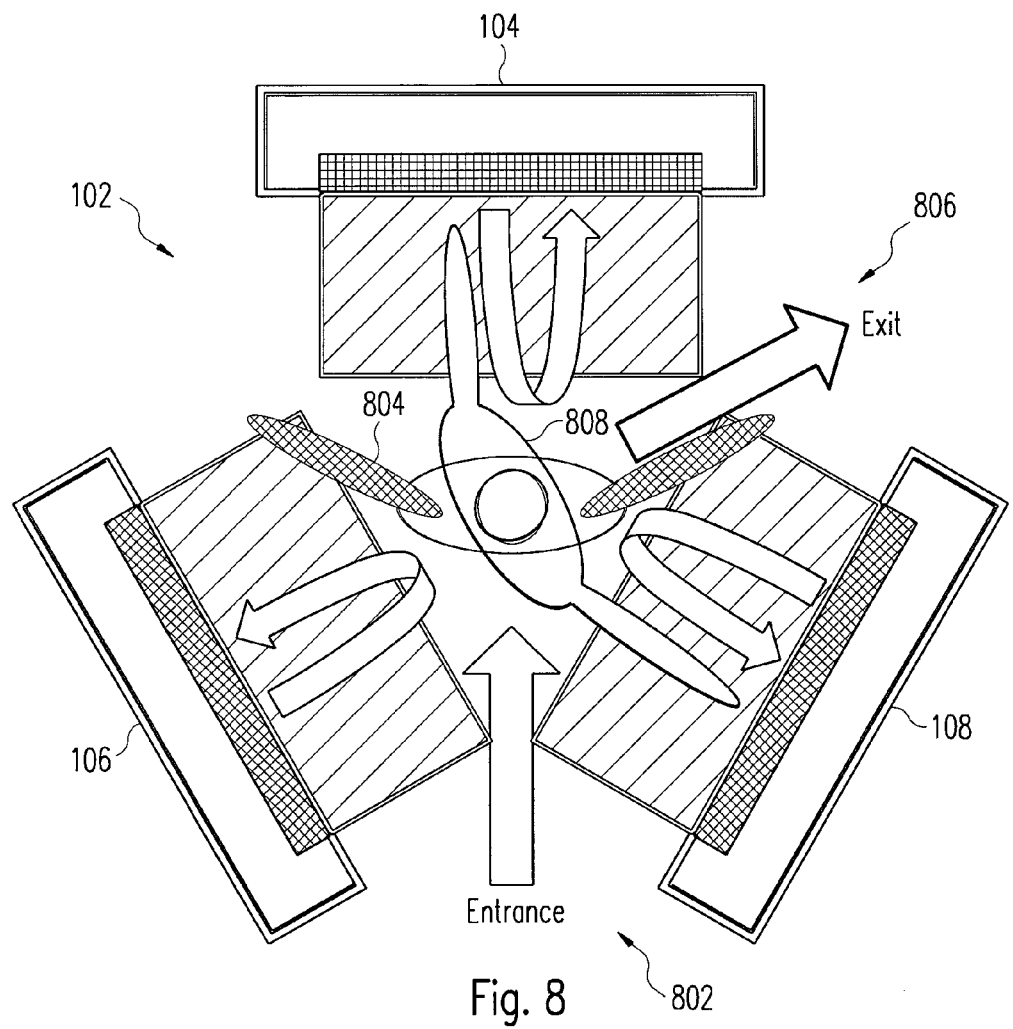
Figure 9:
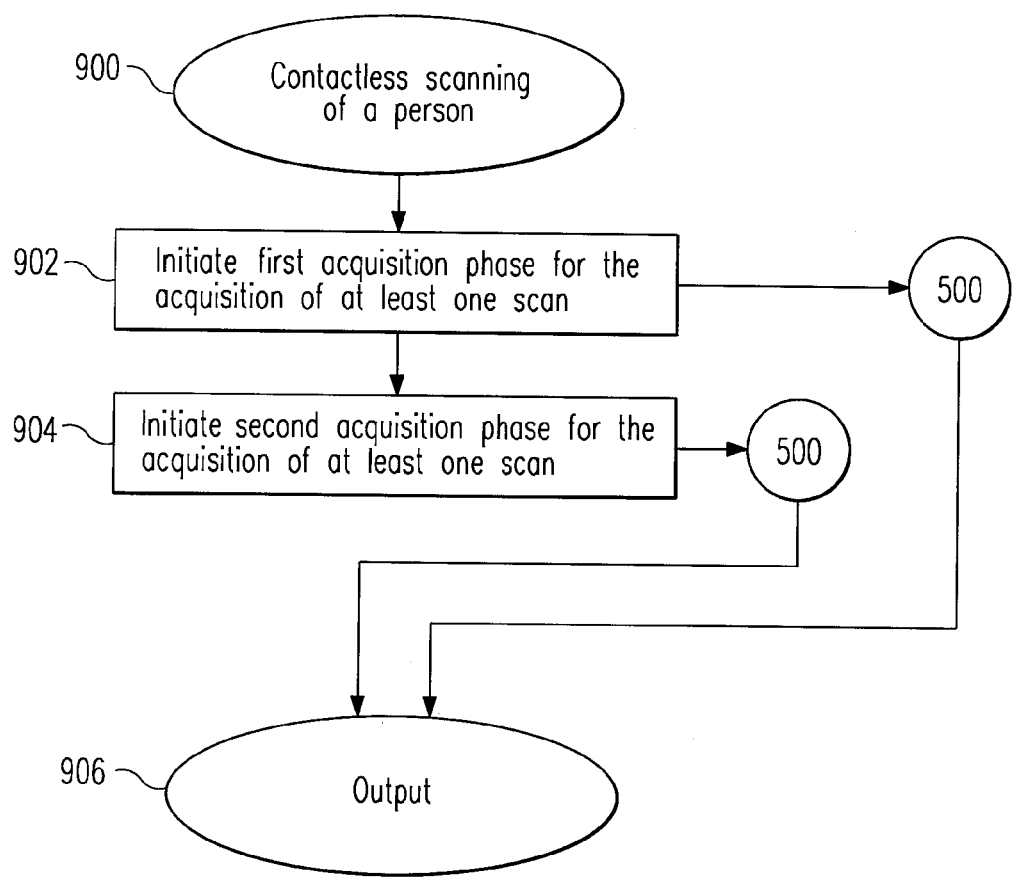
Figure 11:
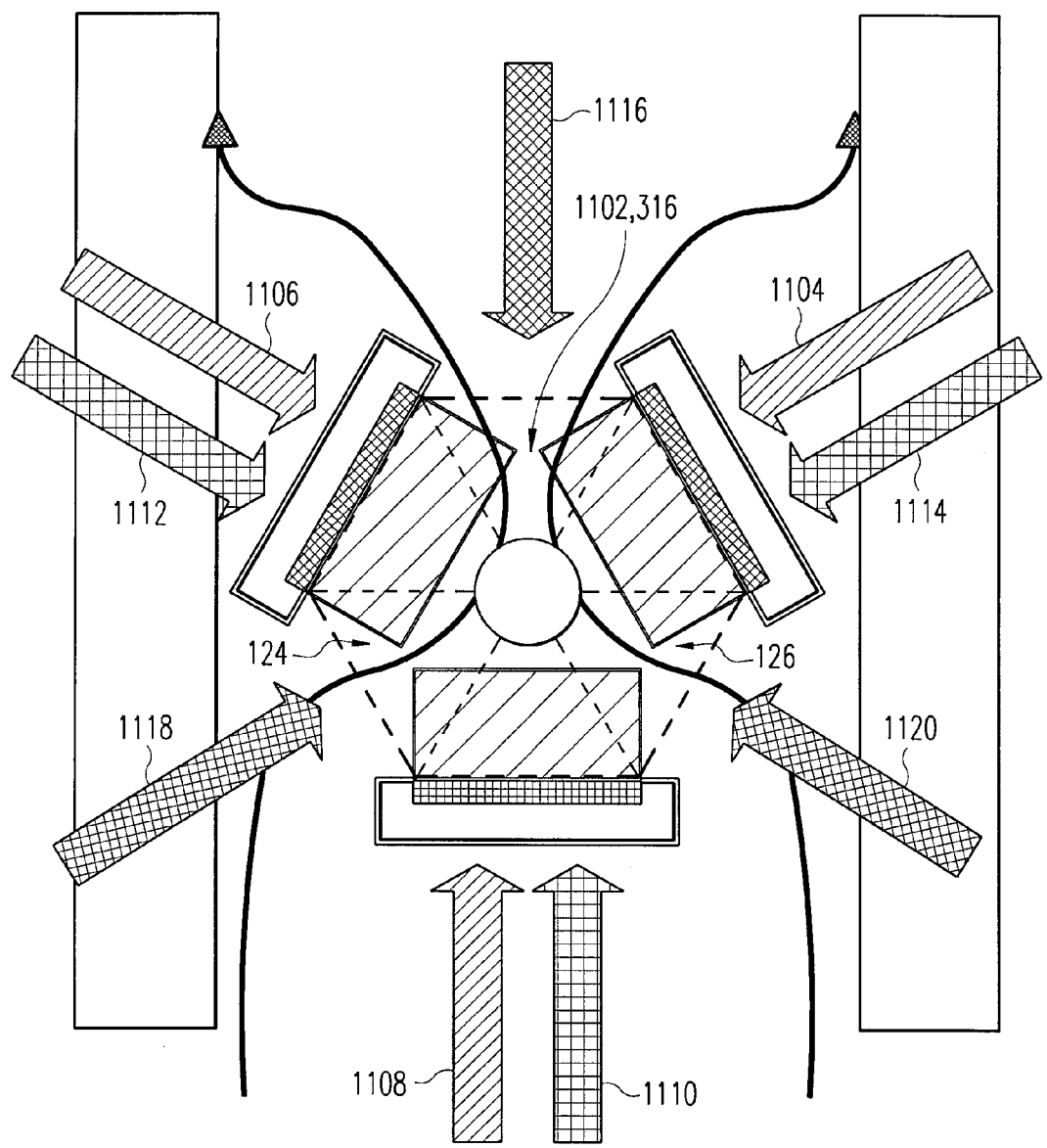
Figure 12:
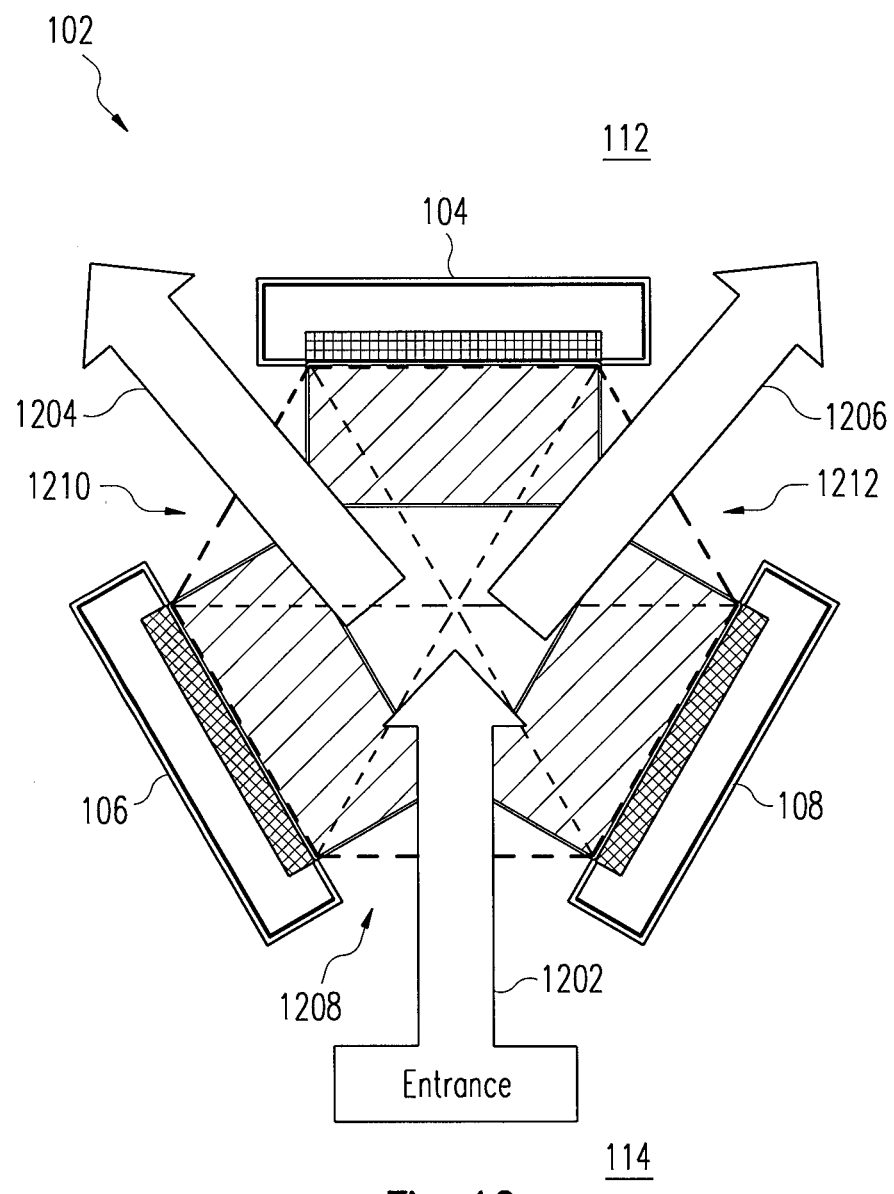
Figure 13:
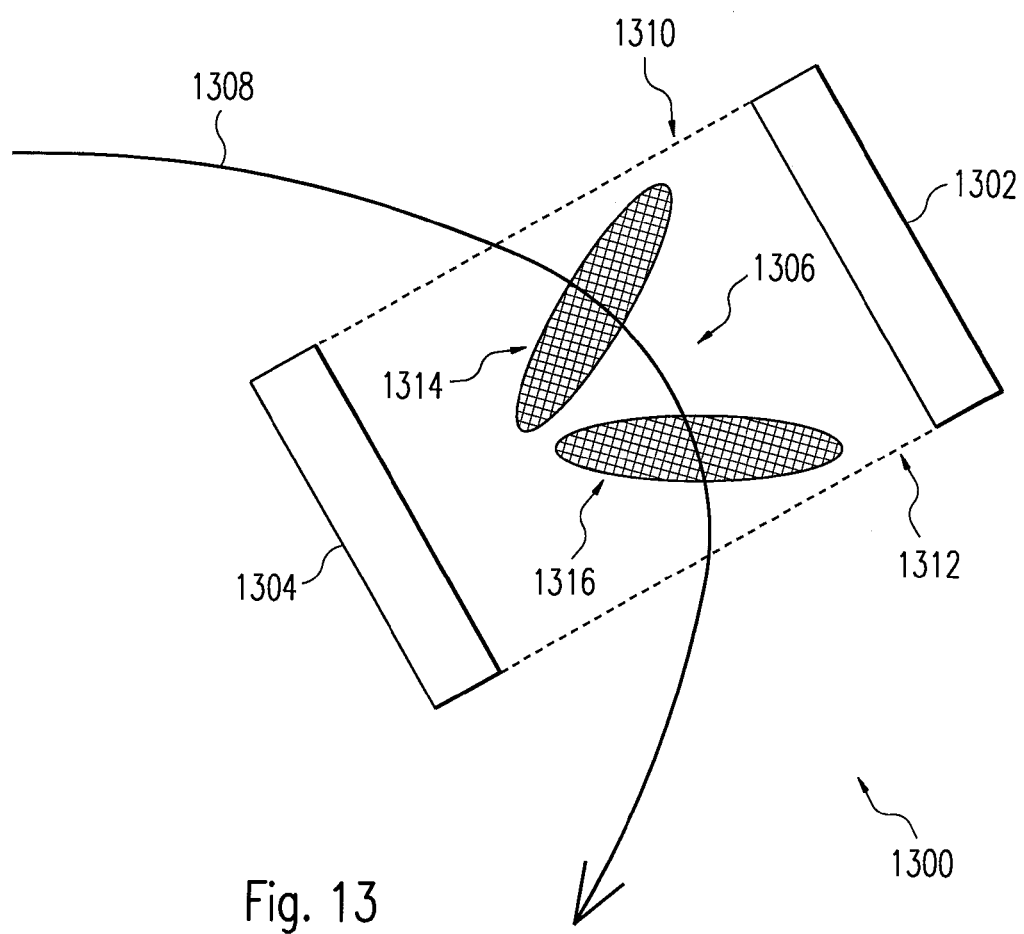

Further aspects and advantages of the present disclosure are described in the following on the basis of the attached drawings. In this context the drawings show:

FIG. 1A a schematic plan from a bird's-eye view of a panel arrangement, in accordance with an exemplary embodiment;

FIG. 1B a further plan view of the panel arrangement of FIG. 1A in a different operational configuration;

FIG. 2 a schematic view of one of the panels from the facility shown in FIGS. 1A, 1B and 2;

FIG. 3 a view of the panel arrangement from FIG. 1B with a person;

FIG. 4 a functional block-circuit diagram with further components of a system which includes the panel arrangement from the preceding Figs.;

FIG. 5 a method of functioning of the system from FIG. 4 in the form of a flow chart;

FIG. 6 a visualisation of inter-panel scans and the formation of a virtual aperture in schematic form;

FIG. 7A-B examples of complementary scans from real aperture and virtual aperture;

FIG. 8 a visualisation of a process for the acquisition of further complementary views through several acquisition phases in schematic form;

FIG. 9 a further method of functioning of the system according to FIG. 4 in the form of a flow diagram;

FIG. 10A-B examples of complementary scans obtained from two acquisition phases;

FIG. 11 a visualisation of a process for the acquisition of a plurality of complementary views in order to achieve a full illumination with the arrangement according to FIG. 1A;

FIG. 12 a visualisation of different operational embodiments of a unit in the configuration of FIG. 1B; and FIG. 13 a plan view of a further panel arrangement in accordance with an exemplary embodiment.

FIG. 1A shows a schematic bird's-eye view of an exemplary embodiment of a system 100 with a panel arrangement 102 comprising three panels 104, 106, and 108. The arrangement or respectively facility 100 is disposed in a control region 110 for the implementation of an access control, in order to control access to a security region 112 of an airport, building etc. Starting from an un-secured region 114, it is necessary to pass through the control region 110, which is limited at the side by barriers 116, 118, which can be realised, for example, in the form of baggage conveyor belts, partition walls, barrier tapes etc. in order to gain access to the security region 112.

Within the control region 110, the facility 102 is provided in such a manner that the latter must be passed in order to reach the security region 112. For this purpose, two routes 120, 122 are provided, which have been drawn into FIG. 1A for the purpose of illustration, but can also be realised in a real configuration, for example, in the form of floor markings. The routes 120, 122 lead from the un-secured region 114 via different walk-through passages 124, 126, which partially overlap, through the system 100 into the security region 112.

The system 100 is used for scanning persons following the routes 120, 122 during their passage 124 or 126 in a contactless manner by means of micrometer waves or millimeter waves, for example, in order to detect objects concealed, for instance, beneath the clothing. Other systems, such as, metal detectors, can be provided in the control region 110, but these have been omitted in FIG. 1A for the sake of visual clarity. A floor and/or a roof of the arrangement 102 can be connected as a reflecting surface for improved illumination, for example, reflector elements can be provided for this purpose.

FIG. 1B shows the system 100 with the panel arrangement 102 again, however, in this case, the arrangement 102 is rotated through 180° by comparison with the configuration of FIG. 1A, so that the access to the facility 102 is possible now only through one entrance, however, this can be left via two different routes. The walk-through passages 128 and 130 accordingly differ from the passages 124 and 126 from FIG. 1A.

The facility 100/102 as shown in FIGS. 1A and 1B can be realised through checkpoints, such as are conventional, for example, at airports; in that context, the control regions can have a width of, for example, 2.50 m. One of the configurations of FIGS. 1A and 1B, or yet another configuration, can be particularly appropriate in the case of an integration into a control region, in order to optimise an overall context comprising detection capability, operational procedures etc. In the subsequent Figs., technical aspects of the facility 100/102 are initially discussed independently of an embedding in a control region. The presentation in the following Figs. therefore sometimes makes reference arbitrarily to one and sometimes to the other configuration.

FIG. 2 shows an individual 104 one of the panels of the system 100 from FIG. 1A/1B. The panel 104 has been selected merely for the purpose of explanation, and the subsequent description can refer equally well to one of the panels 106 or 108. In general, panels of identical construction can be used for the construction of a system according to the present disclosure, however, this is in no sense obligatory.

The panel 104 in FIG. 2 is also shown from above. The panel 104 provides a frame 202 in which a schematically indicated two-dimensional array (antenna field) 204 is accommodated, which includes a plurality of transmitting antennas for the transmission of radiation and receiving antennas for the reception of, for example, radiation reflected from the irradiated object. The antennas can transmit or respectively receive, for example, frequency vectors within a range of approximately 26.5 GHz-40 GHz (low resolution) and/or within a range of approximately 70 GHz-80 GHz (high resolution). Frequency bands or respectively measurement sensitivities used can be designed, for example, so that they can be switched or respectively added. Accordingly, for example, a relatively higher resolution can be selected by operating personnel or automatically, for example, in order to detect or respectively identify given features more accurately.

The antennas can be organised in the form of one or more transmitting or respectively receiving units, modules or similar. The frame can have a width 206 within the range of, for example, 1 m-1.50 m. A height can be, for example, within the range from 2 m-2.50 m. A depth 208 of the frame 202 can be, for example, within the range from 20 centimeters (cm) up to 60 cm. The frame can be supported on a base of the control region 110 by supports, which are not illustrated.

The array 204 is attached or respectively introduced or otherwise provided on a front side 210, defined by it, of the frame 202 or respectively panel 104. Through the transmission of radiation in a direction indicated only very generally by the arrow 212, or respectively through the reception of radiation from a direction indicated only very generally by the arrow 214, an image-capture region 216 is defined in front of the front side 210, which represents a preferred volume outside a minimum spacing distance 218 from the front side 210 of the panel, in order to acquire a scan, for example, of a person. A region 220 in front of the array 204 within the minimum spacing distance 218 can include a mirror surface, for example, in the form of a floor mirror. Ideally, a person to be scanned does not stand on the floor region 220 during the scan acquisition, but rather in front of it; however, intra-panel and respectively inter-panel scans can also be acquired without difficulty if the person is disposed partially within the volume above the mirror area 220, for example, with their arms.

FIG. 3 once again shows a bird's eye view of the system 100 from FIG. 1B with its panel arrangement 102, wherein a person 302 is indicated schematically here in a space between the panels 104, 106 and 108.

The panels 104, 106 and 108 are associated with one another with their respective front side 210, 304 and respectively 306, in such a manner that the respective mirror surfaces or respectively mirror regions 220, 308 and respectively 310 do not touch. A triangle 320, indicated by dashed lines, points with its apex 312 (at which the person 302 is disposed) towards the image-capture region 216 in front of the panel 104. A base side 322 of the triangle 320 is formed by the array 204. The image-capture regions 312 and respectively 314 of the panels 106, 108 are indicated in a corresponding manner by triangles 324, 326 with bases 328 and 330.

In particular, the panels are arranged 102 in such a manner that the image-capture regions 216, 312 and 314 overlap, that is, form a common image-capture region 316. If the person 302 is disposed within the region 316, the panels of the arrangement 102 can advantageously acquire, for example, substantially simultaneously, a plurality of mutually complementary images of the person 302. In the example of FIG. 3, the following intra-panel scans or respectively images can be acquired: the panel 104 can provide a frontal view of the person 302; the panel 106 can provide a lateral view from 60° rear left; and the panel 108 can provide a lateral view from 60° rear right.

The images acquired in this manner are complementary to one another, since, for example, the rear views of the person 302 acquired from panels 106 and 108 overlap as well as supplementing one another. Accordingly, structures, edges, potential objects, for example, at the rear of the person 302 becomes visible in at least one, in many cases in both rear views. This allows, for example, a downstream processor and/or operating personnel to detect and ideally to identify objects possibly present at the rear of the person 302 during the simultaneous observation or respectively analysis of the rear views.

In the same manner, the frontal view acquired from panel 104 and the left lateral view acquired from panel 106, or respectively the frontal view acquired from panel 104 and the right lateral view acquired from panel 108 are also complementary to one another.

In order to obtain such complementary views, the arrangement 102 of panels can provide the common image-capture region 316; the latter allows a substantially simultaneous acquisition of the complementary views, wherein the term 'simultaneous' relates to the position and posture of the person 302 and technical details of the scan acquisition are not relevant here.

Furthermore, the panels are positioned in a given angled manner relative to one another, that is, their front sides 210, 304 and 306 face towards one another in such a manner that, for example, supplementary information about the probable presence or non-presence of articles (objects) can be acquired, for example, from two images respectively from adjacent panels through mechanical post-processing of the images.

For example, in the case of panels of identical construction, the latter can be arranged at an identical spacing distance from one another on an imaginary circular line. Accordingly, the three panels of the arrangement 102 in FIG. 3 are arranged in the form of an equilateral triangle, that is, the panels are offset from one another in each case by approximately 60° (compare the angle 132 indicated by way of example between the panels 104 and 106 in FIG. 1A). However, the mutual angular offset can also be selected to be different, for example, the angular offset between a pair of panels can be 70°, and the angular offset between the two respectively other pairs can be only 55°. Such configurations prove advantageous with regard to the acquisition of complementary views. With an angled walk-through passage, such configurations are readily possible.

FIG. 4 shows in schematic form the system 100 with the panel arrangement 102 from the preceding Figs. and further components, especially a central processor or respectively evaluation unit 402, a display or respectively display terminal 404, and a position tracking sensor ("position tracking sensor") 406.

In particular, the panels of the arrangement 102 can be arranged as already discussed with reference to FIG. 3. The sensor equipment 406 can be, for example, a tracking sensor, a floor mat with position sensor, an optical camera and/or a 3-D infrared camera, for example, in the form of a motion sensor. In this context, a registered sensor range can include the interior of the facility 102, especially the preferred image-capture region 316.

In a floor of the facility or of the control region, for example, in addition to or alternatively to floor mirrors, a shoe scanner can be integrated in the region 316, which evaluates symmetry between shoe contents and millimeter-wave scans and outputs an alarm, for example, if an asymmetrical shape is detected. Such sensors can also be connected to the central computer 402, which can be embodied to implement the analysis indicated.

The unit 402 can be embodied in a central computer ("central computer") or CPU, for example, in the form of a PC or comparable configuration. The processing unit 402 can control the panels 104, 106 and 108, for example, that is, their transmitting antennas, and can also be embodied to calculate scans based on signals received by the receiving antennas and to acquire views from the scans. The processing unit 402 can also be embodied, for example, for transmitter-end and/or receiver-end synthetic focusing. The connected display device 404 can include a computer terminal, computer display, computer monitor etc. Additionally or alternatively, output devices can be provided for storage, printing etc. of scans and/or images.

For the acquisition of inter-panel scans, an inter-panel synchronisation of the phase position must be possible, that is, for example, a central or common phase position must be specifiable. For this purpose, for example, the central computer 402 or one of the panels 104, 106 or 108 can be used as a central source. With one configuration, for example, a master panel can therefore function as a clock-generator or respectively phase-generator for two slave panels. A true-to-coordinate combination of individual scans or respectively views is therefore also possible, for example, for 3-D displays. It is advantageous if the panels or respectively their arrays are operated in a multistatic mode.

The central computer 402 can be embodied, for example, for data fusion, in which, for example, data from different sensors is fused, for instance, data from different micrometer-wave sensors, such as the arrays of the panels of the arrangement 102, but also from a shoe scanner, optical and/or IR sensors etc. Additionally or alternatively, data from different sensors can also be combined on an analysis plane. For example, previous knowledge from optical images can be used to reduce false alarms from the detection in the microwave range, and/or vice versa.

An exemplary method of functioning of the system 100 is described in greater detail in the following with reference to the flow diagram in FIG. 5. In general 500, the system 100 is used for scanning a person or respectively for the acquisition of a plurality of scans or respectively images, especially for the detection of objects concealed beneath the clothing. In step 502, an intra-panel scan is prepared for each of the panels 104, 106, 108, that is, each panel transmits microwave signals, and filter devices are configured so that received signals of every panel which are associated with their own transmitted signals are acquired. This is indicated by the arrow 408 in FIG. 4 for panel 104. Such intra-panel scans have already been discussed with reference to FIG. 3.

In a step 504, at least one inter-panel scan is prepared, that is, at least one panel receives transmitted signals from at least one of the other panels of the system. These signals are evaluated in the panel and/or the central computer 402 and corresponding scan datasets are prepared. In FIG. 4, the arrows 410 and 412 indicate that, by way of example, panel 104 receives transmitted signals from panels 106 or respectively 108 and an inter-panel scan is prepared in each case from these.

In the most general case, each of the panels 104, 106 and 108 can prepare two inter-panel scans as described above in each case. For this purpose, the panels can simultaneously transmit signals transmitted in each case with mutually displaced frequencies or respectively frequency vectors. Additionally or alternatively, the panels can also transmit their transmitted signals at different times, that is, at slightly displaced times, in which the position of an object under investigation is substantially unchanged. Dependent upon the design, the preparation of several inter-panel scans per panel can overload existing processing capacities of the panels or respectively lead to a delayed data output. Other configurations which require lower capacities or respectively allow an accelerated data output are discussed in greater detail below with reference to the example of FIG. 6.

Steps 502 and 504 can be implemented simultaneously, so that an intra-panel scan and one or two inter-panel scans are acquired from each of the panels, that is, a maximum total of 9 scans. The term 'simultaneously' once again ignores any displacements between transmitted signals of one panel and/or of the different panels in order to allow an acquisition of the scans.

The data acquired can be further processed by the central computer 402, possibly after pre-processing in the individual panels. Accordingly, the central computer 402 can prepare an image from the perspective of a real aperture, for example, in step 506 from an intra-panel scan, and, in step 508, can then construct a view of the person and/or of an object in the image-capture region 316 from one inter-panel scan, or from two inter-panel scans of a panel pair. The view can be constructed as if it were acquired from a virtual aperture, as will be described in greater detail in the following.

In step 510, the images prepared from the intra-panel scans and the combinations of inter-panel scans are output for display on the screen 404.

Accordingly, a plurality of the acquired complementary views can be displayed on the screen, for example, in the form illustrated below in FIGS. 7A, 7B, 10A, 10B. However, additionally or alternatively, acquired scan data can also be projected onto a 3-D avatar. Detected structures, which are attributable, for example, to objects possibly requiring further identification or to undesirable objects, can be displayed, additionally or alternatively, as projections on images. For example, light signals on an avatar, can faithfully map optionally detected anomalies according to type and position in order to minimise the risk of confusion.

According to the procedure of FIG. 5, intra-panel scans and also inter-panel scans are prepared. With other exemplary embodiments, however, only intra-panel scans, or only inter-panel scans may be prepared.

On the basis of the panel arrangement 102 from FIG. 1B, FIG. 6 explains schematically the principle of inter-panel scans and virtual aperture. Every panel (more precisely, every array) can provide a real aperture. These are symbolised in FIG. 6 as segments 602, 604 and 606 around the image-capture region 316, wherein the segments indicate an observation angle into the image-capture region 316 as it appears from the arrays of panels 104, 106 and 108.

Images from the imaging data from intra-panel scans are constructed on the basis of a real aperture, as indicated by the arrow 408 (compare also FIG. 4) for panel 104, that is, an intra-panel scan based on transmitted signals of panel 104 received by panel 104 can be used in order to construct a view of the image-capture region 316 from the observation angle of the aperture 602. The aperture 602 is designated as a 'real' aperture, because the observation angle 602 is that of the really existing array 204 of the panel 104.

Furthermore, the array 204 of panel 104 can receive transmitted signals, for example, from the array of panel 106, as indicated by the arrow 410. For this purpose, panel 106 transmits at a different time from panel 104 and/or on a different frequency or respectively different frequency vector. The receiving devices of the panel 104 and/or of a signal processor connected downstream of the panel then filters or respectively processes received signals which result from the transmitted signals of the panel 106 and have been reflected, for example, from a person or an object in the image-capture region 316.

The inter-panel scan indicated by the arrow 410 can be processed to form an image constructed from the perspective of a virtual aperture. FIG. 6 illustrates virtual apertures through segments 608, 610 and 612, which are supposed to indicate corresponding observation angles onto the image-capture region 316.

The observation angle of the aperture 608 into the image-capture region 316 is that of a panel or respectively array which is disposed between the really existing panels 106 and 104. Such a panel or respectively array does not, however, exist, and accordingly the aperture 608 is designated as a 'virtual' aperture. In FIG. 3, by analogy with the reception triangle 320 for the real array 204, the reception triangle 332 with base line 334 has been indicated for the virtual array or respectively the virtual aperture 608. The aperture 608 is the observation angle of the inter-panel scan or respectively image resulting from the signal pathway 410. It is advantageous to select the observation angle of the virtual aperture 608 for the image constructed from the inter-panel scan 410, because transmitted signals of panel 106, for example, from the perspective of the real aperture 602, hardly illuminate a structure localised in the image-capture region 316.

For an image constructed from the observation angle of the virtual aperture 608, additional scan data, for example, such as are obtained from the inverted signal pathway, that is, from an inter-panel scan resulting from microwave signals transmitted from panel 104 which are reflected from an object in the image-capture region 316 in the direction towards the panel 106 and detected there, can be used alongside scan data obtained from the signal pathway 410. For a view from the observation angle of the virtual aperture 608 between the real apertures 604 and 602, a combination of the illustrated signal pathways can lead to an overall improved illumination, for example, with regard to the overall illumination intensity.

For the virtual apertures 610 and 612 or respectively the virtual panels 336 or respectively 338 according to FIG. 3, the same applies as discussed above for the aperture 608 and the virtual array 334.

In the case of the configuration shown in FIG. 6, each panel receives only the signals from an adjacent panel. For example, an allocation of transmitting and receiving panel can be propagated in a cyclical manner by the arrangement 102. As indicated, for example, in FIG. 6, the panel 104 provides only a single inter-panel scan, namely from the perspective of the virtual aperture 608, and for this purpose receives transmitted signals only from panel 106. The inter-panel scan from the perspective of the virtual aperture 610 could be provided from the panel 108, which receives transmitted signals from panel 104 for this purpose, and the inter-panel scan from the perspective of the virtual aperture 612 could be prepared from panel 106, which receives transmitted signals from panel 108 for this purpose.

By contrast with the configuration from FIG. 4, the loading of panel 104 with signal reception and signal evaluation is therefore reduced, that is, in the preparation of inter-panel scans for all three virtual apertures 608, 610, 612, the loading is distributed uniformly between all panels. For panels of identical construction this configuration is particularly suitable. However, for example, if panel 104 provides a higher performance than the other panels, panel 104 can be charged with the preparation of several inter-panel scans, as discussed with reference to FIG. 4.

By way of example, FIGS. 7A and 7B show a set of complementary views of a person under test. The person stands frontally facing panel 104, compare also the illustration in FIG. 3. With reference to the configuration in FIG. 6, the person is disposed in the joint image-capture region 316 of the panels of the arrangement 102 or respectively in the focus of the real apertures 602, 604, 606 (FIG. 7A) or in the focus of the virtual apertures 608, 610, 612 (FIG. 7B). From the observation angle of the real apertures in FIG. 7A, a frontal view and two lateral views of the person from behind are obtained.

From the observation angle of the virtual apertures according to FIG. 7B, further views of the person can be acquired through individual inter-panel scans or a combination of pairs of inter-panel scans, and, in fact, from behind and from laterally in front.

The example of FIGS. 7A and 7B visualises the manner in which complementary views can contribute to an optimisation of a detection capability. From the observation angle of the virtual aperture 612, it is clearly evident that the person under test is carrying an object on their back, which could easily be overlooked from the images with the real apertures 608 and 606. As illustrated in the Figs., the mutually supporting images of one set can generally allow operating personnel to gain an overview of potentially concealed objects in a short time.

As also evident from the example of the Figs., the plurality of possible complementary views can be considerably increased through the option of constructing inter-panel scans. In the example, the addition of virtual apertures to the real apertures doubles the number of possible views.

FIG. 8 once again illustrates the panel arrangement 102 of the system 100 from FIG. 1B. A person enters the arrangement 102, for example, through an entrance 802 and, in this context, takes up a position (posture, orientation) indicated by the contour 804. In order to leave the arrangement 102 via an exit 806, the person must complete a turn and, after that, adopts a position indicated by the contour 808, that is, the walk-through passage or respectively route leading from the entrance 802 to the exit 806 is angled. As a result of the obligatory turning of the person from the first position 804 into the second position 808, it is possible for one and the same panel to acquire two intra-panel and/or inter-panel scans of the person from different observation angles towards this person.

As illustrated schematically in FIG. 8, a person can be caused to perform a turn when passing through the arrangement 102 by providing an angled walk-through passage. In other words, a panel arrangement or facility can be designed so that a walk-through passage is provided in such a manner that at least one of the panels can acquire at least two views of the person before and after a turn, a bend, an entrance into the angled passage etc. An angled walk-through passage can be defined by guide elements such as barriers etc. and/or an arrangement of the panels themselves. For example, the entrance 802 leads frontally towards the panel 104, so that the route must necessarily turn in front of the panel 104.

With reference to FIG. 9, a further exemplary embodiment of a method of functioning of the system 100 from FIG. 4 will be described, wherein the operation of the system makes use of an angled walk-through passage with entrances and exits arranged differently, that is, at an angle relative to one another, as in FIG. 8. Here also, the system 100 is used 900 for the scanning of a person or respectively for the acquisition of a plurality of scans or respectively images, especially for the detection of objects concealed beneath the clothing.

In step 902, a first acquisition phase for the acquisition of at least one scan is initiated. For example, a position sensor such as the sensor 406 from FIG. 4 can be provided, through the signal of which the acquisition of a first set of intra-panel and/or inter-panel scans is triggered when the person is disposed, for example, during or after entering the arrangement 102, in a first position, such as the position 804 in FIG. 8. In detail, the first acquisition phase can include a procedure as discussed with reference to the procedure 500 in FIG. 5.

In step 904, a second acquisition phase for the acquisition of a further scan is initiated. For example, the position sensor can trigger the acquisition of a further set of scans, if the person is disposed, for example, in a second position, before or during the leaving of the arrangement 102, for example, the position 808 in FIG. 8. The second acquisition phase can also include a procedure as discussed with reference to the procedure 500 in FIG. 5.

In response to a signal from the sensor 406, the central computer 402 can trigger the acquisition of the scans in the first and respectively second acquisition phase, for example, if a position of the person, an orientation, a physical posture and/or the presence of other features is detected.

During an acquisition phase, some or all of the panels of the arrangement can be operated in parallel, for example, with mutually displaced frequencies or respectively frequency vectors, or the panels can transmit at times slightly displaced relative to one another.

In step 906, in each case, views derived from the scans of the first acquisition phase 902 and the second acquisition phase 904 are prepared and output on the screen 404.

According to the procedure of FIG. 5, intra-panel scans and also inter-panel scans are prepared. However, in each of the two acquisition phases 902 and 904, only intra-panel scans or only inter-panel scans can be prepared. For example, the construction of inter-panel views could be dispensed with. With a given exemplary embodiment, inter-panel scans could in fact be measured, but without constructing views from them, for example, from an observation angle of a virtual aperture. However, these views could be added optionally, if, for example, the operating personnel activate a corresponding entry into the system and therefore cause a construction of a view.

Such a configuration can be advantageous in order to minimise the duration of an evaluation phase, for example, in cases in which an analysis by operating personnel and/or the system has provided an uncritical result, for example, because it provides no indications of concealed objects. Even if a plurality of complementary scans or respectively views have already been acquired in the two (or more) acquisition phases, the preparation of further views may, under some circumstances, be dispensed with. Vice a versa, it is also possible that, a second or further acquisition phase can be dispensed with by preparing a plurality of views with the potential (possibly optional) inclusion of inter-panel views.

By way of example, FIGS. 10A and 10B show a set of complementary views of a person under test. The person walks through the unit 102 as illustrated in FIG. 8. Only intra-panel scans are acquired, and the views shown are constructed from these. The scans of FIG. 10A are acquired before, and the images of FIG. 10B are acquired after a turning of the person through the unit 102 along the angled walk-through passage.

To explain this more precisely, the person in FIG. 10A has entered the facility 102 via the entrance 802 and occupies the position 804. From the observation angles of the real apertures 602, 604, 606, a frontal view and two lateral views from behind are acquired in the first acquisition phase. In FIG. 10B, the person starts to leave the facility 102 via the exit 806 and, for this purpose, has turned to the position 808. From the unchanged observation angles of the real apertures 602, 604, 606, a frontal view and two lateral views from behind are acquired in this second acquisition phase.

A comparison of FIGS. 7B and 10B shows that comparable views are acquired in both cases, namely, a rear view and two lateral views from the front. In total, a comparable set of complementary views of a person can therefore be obtained in both configurations. As a result, there are possibilities for acquiring an even greater plurality of images, and/or for optimising the operation, dependent upon concrete configuration, hardware/software equipment etc., with regard to short measurement times, short times for post-processing for the acquisition of images from scan datasets, and/or configuration possibilities for operating personnel for the optimised evaluation of individual persons to be scanned.

In order to acquire a plurality of complementary images, for example, at least two acquisition phases can, in principle, be provided (more than just two phases can also be provided). If it happens that only one acquisition phase can be implemented or has been implemented, for example, because a sensor has identified only one optimal positioning, another method for the acquisition of complementary images can be added automatically by the system or by a user entry. For example, if a first acquisition phase has not been triggered by a person entering the facility, the system can automatically add the acquisition of inter-panel scans to an acquisition of intra-panel scans (or vice a versa) in a second acquisition phase.

However, if a first acquisition phase has been successful, but a second acquisition phase has not been triggered or adequate visual material has not been delivered, a retrospective construction of inter-panel scans or respectively images from the first acquisition phase can be implemented. For this purpose, a measurement and reception phase for the acquisition of one or more inter-panel images would in fact always be implemented, but a downstream processing would only be triggered if, for example, the intra-panel scans or respectively images from the first and/or second acquisition phase are regarded as inadequate for detection. A corresponding judgement can be made by the system and/or by the operating personnel.

FIG. 11 again shows the control region 110 in the configuration of FIG. 1A with panel arrangement 102 comprising three panels which embody two angled walk-through passages 124 and 126. FIG. 11 shows schematically how a full illumination of a person 1102 can be achieved when the person moves through the facility 102. As indicated by the arrows 1104, 1106 and 1108, when the facility is entered, a frontal view of the person (1104) and two lateral views from behind (1106, 1108) are acquired, based upon intra-panel scans in a first acquisition phase. In a second downstream acquisition phase, a rear view (1110) and two lateral views from the front (1112, 1114) are acquired, also based on intra-panel scans.

The example of FIG. 11 indicates that inter-panel scans can optionally be acquired in the second acquisition phase, from which, for example, three views can be prepared from virtual aperture: a front view (1116) and two lateral views from the rear (1118, 1120). It may be that inter-panel scans are also acquired in the first acquisition phase, which are, however, not further processed to form views from a virtual aperture, for example, in order to minimise preparation times for views.

In the configuration of FIG. 11 with only three panels, a total of 9 complementary views are acquired, that is, views from different directions rotated through 60°, and from two different postures which the person adopts on their way through the unit 102. As a result, the detection capability is strongly improved with surprisingly simple measures by comparison with a facility with only one panel or two panels disposed opposite to one another with a straight passage: an angled walk-through passage extending between the panels of the arrangement is provided. Three panels which are arranged relative to one another with an appropriate angular positioning in such a manner that complementary views can be acquired are then sufficient. The latter can contain one or both of the aspects, namely that several acquisition phases based on different orientations of the person during the passage through the arrangement are provided, and that inter-panel scans are prepared.

FIG. 12 shows the exemplary panel arrangement 102 from FIG. 1B, wherein, with regard to the control region 110, only the un-secured region 114 and the security region 112 are indicated. Arrows 1202, 1204, 1206 indicate movement directions of persons through the arrangement or respectively facility 102. Different routes or respectively walk-through passages through the facility 102 are obtained from these movement directions.

The facility 102 includes only one entrance 1208, through which it can be entered 1202. The entrance is embodied by an appropriately selected spacing distance between the panels 106 and 108; this spacing distance allows the passage of a person. Spacing distances between the panels 104 and 106, or respectively 104 and 108, are also embodied as a walk-through passage, so that the exits 1210 and 1212 are obtained. A typical value for a walk-through passage can be, for example, 80 cm.

In one exemplary embodiment, for example, a station with operating personnel can be provided in the direction 1204, for example, in order to implement a manual scanning dependent upon requirements. In the direction 1206, a counter, for example, for passport control or similar, can be provided outside the facility 102. Accordingly, dependent upon the result of the scanning, the person can either pass, for example, to passport control or they are directed to a station with a manual operator.

With given configurations, the system can determine which exit of several exits a person is to take, for example, on the basis of an automatically acquired detection result, such as a detection or non-detection of specified structures. For instance, the system can make a suggestion for a detection result, such as "uncritical" or "manual scanning required", which can be confirmed or amended by the operating personnel. The system can then indicate the given exit, for example, in the form of illuminated markings, for example, on the floor, so that the person is guided towards the exit determined by the system and/or the operating personnel.

With another exemplary embodiment, stations with operating personnel can be provided in both directions 1204 and 1206. It is conceivable that entrance 1208, exit 1210 and/or exit 1212 are provided with a barrier such as a gate, a turnstile etc., for example, in order to channel a passage through the facility 102. Operating personnel and/or floor markings can also mediate the guiding of persons.

With given exemplary embodiments, the facility 102 can be appropriately dimensioned, so that a counter, for example, a ticket counter, is disposed close to one or both of the exits 1204 and 1206. People who are standing in front of the counter or respectively at one or both of the counters, can be scanned by the facility 102. For example, a person at a ticket counter can hand in a boarding card and pass through after a short waiting time if the ticket or respectively the boarding card is in order. During the waiting time, the person can be scanned. After this, the person can be guided to a station with an operator to whom the result of the scanning is accessible. Alternatively, one of the two exits may also not lead to an operator if the result of the scanning showed that a manual follow-up check is not needed for this person.

Further optimisations are possible, for example, if limits to the control region 110 are formed by baggage conveyor belts for the transportation and control of hand luggage. For example, if hand luggage is checked in parallel, an efficient operational procedure is achieved.

A configuration of the panel arrangement 102, for example, as shown in FIGS. 1A and 11, in which two entrances are provided, allows an uncomplicated access to the facility 102, for example, from the left and right baggage conveyor belts 116 and 118. At the same time, free visual access to the adjoining security region 112 is already possible from the image-capture region 316, for example, in a region in which a manual follow-up check is optionally implemented. The panel 104 can offer a certain visual protection with regard to visual access from the unsecured region 114 in an uncomplicated manner in this context. Since only one exit is provided in this configuration, only minimal control personnel are required. Downstream sensors, for example, a tunnel for metal detection, need only be provided once.

By contrast, a configuration of the panel arrangement 102, for example, as shown in FIGS. 1B and 12 in which two exits are provided, allows a simply differentiated guiding of persons, for example, dependent upon a scanning result, as discussed above.

FIG. 13 shows a further example of a panel arrangement 1300 with only two panels 1302 and 1304. The arrangement 1300 can be a part of a system as was discussed above, for example, with reference to FIG. 4. In the following, only differences of the arrangement 1300 from the configurations discussed elsewhere in this specification will be described.

The panels 1302 and 1304 can be arranged opposite to one another, that is, with an angular offset of 180°. In the case of panels of identical construction, a common image-capture region 1306 can be provided in the middle, between the panels. A walk-through passage 1308 is provided, which can be marked with markings, barriers etc., which are not shown here. By way of difference from the preceding examples, the desired route need not be explained or enforced merely by the arrangement of the panels. The route 1308 leads through an entrance 1310 into the arrangement 1300, and through an exit 1312 out of the arrangement 1300 again. Entrance 1310 and exit 1312 are each defined by mutually adjacent edges of the panels 1302 and 1304, as also in the preceding examples.

As indicated schematically in FIG. 13, the walk-through passage 1308 extends in an angled manner within the arrangement 1300. Accordingly, a person moving along the route 1308 through the facility 1300 must turn from an entrance orientation 1314 to an exit orientation 1316. A first acquisition phase can be provided in which the person is still disposed in the position 1314 after entering the unit. In this phase, the panel 1302 can acquire an intra-panel scan on the basis of which a person view from laterally front left can be prepared. Simultaneously (or substantially simultaneously, that is, the person continues to be disposed in the position 1314), the panel 1304 can acquire an intra-panel scan in this phase on the basis of which a person view from laterally rear right can be prepared.

A second acquisition phase can be triggered as soon as the person has turned into the position 1316 in order to leave the facility. In this phase, the panel 1302 can acquire an intra-panel scan, on the basis of which a person view from laterally rear left can be prepared. At the same time, the panel 1304 can acquire an intra-panel scan in this phase on the basis of which a person view from laterally front right can be prepared.

Accordingly, on the basis of only two panels, between which an angled walk-through passage leads, a full illumination of a person can be obtained, wherein the full illumination is represented by four images from complementary observation angles.

The named examples can also be combined. In this manner, systems and facilities can be integrated in a control procedure or respectively in a control region, a checkpoint etc.

The optimised detection capability of certain embodiments can also allow a person search, that is, an identification or verification or respectively falsification of one person as the target person among persons passing through the facility. For this purpose, known biometric data can be used, such as body size (optionally without hair and heels), body shape, body proportions (a full illumination is required for this, as discussed, for example, with reference to FIG. 11, in order to combine a 3-D volume), relatively large scars (centimeter range), an ear shape, nose shape, spacing between eyes, finger sizes and/or other body features. A detection sensitivity can be adjusted dynamically or adaptively for calibration in an automated and/or manually configurable manner, for example through the use of appropriate frequency vectors.

The present disclosure is not restricted to the exemplary embodiments described here and the aspects emphasised here; on the contrary, a plurality of variations is possible within the field indicated by the associated claims. In particular, given combinations of features described separately above are evident to the person skilled in the art as expedient or advantageous.

The invention claimed is:

1. A system for scanning persons and/or objects by means of microwaves or millimeter waves with the use of at least one panel with transmitting units and/or receiving units, comprising:
   an arrangement including several panels between which an angled walk-through passage is formed,
   wherein the walk-through passage comprises an entrance and an exit which are each formed between two panels of the arrangement, and the angled walk-through passage extends in an angled manner between entrance and exit, and
   wherein the arrangement is formed with the entrance disposed frontally opposite to one of the panels, and the walk-through passage turns in front of this panel.

2. The system according to claim 1, wherein a plurality of panels are provided which are arranged offset at an angle relative to one another.

3. The system according to claim 2, wherein three panels are provided which are arranged with a specified angular offset relative to one another.

4. The system according to claim 3, wherein:
   the angular offset, which is formed between normals disposed perpendicular to the surface of the panels, is approximately 360°/n, wherein n is the number of panels,
   wherein with the three panels, the specified angular offset is disposed between 100° and 140°.

5. The system according to claim 4, wherein the specified angular offset is disposed between 110° and 130°.

6. The system according to claim 4, wherein the specified angular offset is approximately 120°.

7. The system according to claim 1, wherein a spacing distance between transmitting and/or receiving arrays of two adjacent panels corresponds to the length of a base line of the transmitting and/or receiving arrays of the panels.

8. The system according to claim 1, further comprising a sensor device for detecting a body position and/or a body posture of a person.

9. A method for scanning a person and/or an object, comprising:
   scanning the person and/or object by means of microwaves or millimeter waves with an arrangement of panels between which an angled walk-through passage is formed, the arrangement of panels including transmitting units and/or receiving units;
   wherein the angled walk-through passage comprises an entrance and an exit which are each formed between two of the panels of the arrangement, and the angled walk-through passage extends in an angled manner between the entrance and exit,
   wherein the arrangement of panels is formed with the entrance disposed frontally opposite to one of the panels, and the angled walk-through passage turns in front of this panel, and
   wherein each of the panels of the arrangement receives at least transmitted signals of its own transmitting units, and these are evaluated as an intra-panel scan.

10. The method according to claim 9, wherein a first panel receives the transmitted signals of the transmitting units of a second panel of the system, wherein the transmitted signals are evaluated as an inter-panel scan.

11. The method according to claim 10, wherein in order to acquire several inter-panel scans, an assignment of transmitting and receiving panels is continued in a cyclical manner along the arrangement of the panels in such a manner that each panel receives the transmitted signals of precisely one other panel.

12. The method according to claim 11, wherein a view of the person and/or of the object through a virtual aperture is reconstructed on the basis of at least one inter-panel scan of a panel pair.

13. The method according to claim 12, wherein in a first acquisition phase during the passage of a person through the angled walk-through passage, and in a separate, second acquisition phase, one and the same panel is provided for the acquisition of at least one scan in each case.

14. The method according to claim 13, wherein the first acquisition phase is triggered in the case of an entry into the walk-through passage in order to acquire intra-panel scans, and the second acquisition phase is triggered in the case of a leaving of the walk-through passage in order to obtain further intra-panel scans.

15. The method according to claim 14, wherein inter-panel scans are acquired additionally in at least one of the acquisition phases.

* * * * *